United States Patent [19]

Sair et al.

[11] 3,904,769

[45] Sept. 9, 1975

[54] STRUCTURED PRODUCTS HAVING CONTROLLED GAS-GENERATED CELLS THEREIN AND METHODS OF MAKING THEM

[75] Inventors: Louis Sair, Evergreen Park; Donald W. Quass, Downers Grove, both of Ill.

[73] Assignee: The Griffith Laboratories, Inc., Chicago, Ill.

[22] Filed: May 15, 1974

[21] Appl. No.: 469,940

Related U.S. Application Data

[63] Continuation-in-part of Ser. No. 376,685, July 5, 1973, abandoned, which is a continuation-in-part of Ser. No. 285,422, Aug. 31, 1972, which is a continuation-in-part of Ser. No. 77,720, Oct. 2, 1970.

[52] U.S. Cl. ............ 426/104; 260/112 G; 260/119; 260/123.5; 426/148; 426/205; 426/208; 426/212; 426/364; 426/445; 426/448; 426/450; 426/506; 426/507; 426/802

[51] Int. Cl. .............................................. A23j 3/00

[58] Field of Search ........... 426/104, 364, 507, 516, 426/148, 205, 208, 212, 445, 448, 450, 506, 802; 260/112 G, 119, 123.5

[56] References Cited

UNITED STATES PATENTS

| | | | |
|---|---|---|---|
| 3,102,031 | 8/1963 | MacAllister et al. | 426/208 |
| 3,488,770 | 1/1970 | Atkinson | 426/104 |
| 3,684,522 | 8/1972 | Anker et al. | 426/364 X |
| 3,810,764 | 5/1974 | Waggle | 426/241 |
| 3,812,267 | 5/1974 | Atkinson | 426/104 |
| 3,814,823 | 6/1974 | Yang et al. | 426/364 X |

*Primary Examiner*—James R. Hoffman
*Attorney, Agent, or Firm*—Merriam, Marshall, Shapiro & Klose

[57] ABSTRACT

Methods suitable for use in making expanded products, including improved, structured proteinaceous food products, involving pressing or urging a hot viscous mass (e.g., proteinaceous melt) having a volatile component (e.g., water) through and from a length of an elongated, open-ended die assembly under conditions which produce balloon-puffing, and resulting products. Balloon-puffed proteinaceous products characterized by retaining their structural integrity under retorting conditions. Food compositions (e.g., meat patties) having ground natural meat or flesh (e.g., animal flesh, fowl or fish) therein, and which are advantageously extended by or supplemented with the distributed presence of hydrated balloon-puffed proteinaceous additives having meat-like texture.

45 Claims, 5 Drawing Figures

STRUCTURED PRODUCTS HAVING CONTROLLED GAS-GENERATED CELLS THEREIN AND METHODS OF MAKING THEM

This application is a continuation-in-part of our pending U.S. application Ser. No. 376,685, filed on July 5, 1973, now abandoned, which is a continuation-in-part of application Ser. No. 285,422, filed Aug. 31, 1972, which, in turn, is a continuation-in-part of application Ser. No. 77,720, filed Oct. 2, 1970 insofar as the latter application discloses the joint inventions or improvements of Louis Sair and Donald W. Quass. Application Ser. No. 573,366 to Louis Sair and Donald W. Quass, filed Apr. 30, 1975, is a division of said application Ser. No. 77,720 insofar as the latter application discloses the joint inventions or improvements of Louis Sair and Donald W. Quass.

This invention relates to improved, expanded products, and methods for making such products.

Food technologists have been interested for many years in developing proteinaceous food materials which simulate the texture of natural food products, particularly natural meat-like products. Many efforts heretofore have been made, for example, to develop satisfactory meat substitutes, analogs, extenders or supplements which would possess a high protein content and which would simulate the characteristics found in natural flesh or natural meat or meat-like products.

Our invention yields superior products which are particularly suitable for use as foods or food supplements or extenders.

More specifically, our invention produces structured materials which may be described as tissue-like and as having unusually strong wall structure.

Our preferred products are characterized by good and rapid water absorption properties [e.g., about 125% to 325%, or more water absorption capacity (about 150%, 175%, 200%, 225%, 250%, 275%, 300%, 325%, or more) under boiling and/or retorting conditions] while retaining desirable structure and chewability.

We prefer to produce food products having a density of about 35–65 lbs./ft.$^3$, although food products having a lower or higher density also may be produced. Our preferred products, when included in a meat patty, have good porosity or hydration properties, and impart good fibrous structure, texture or bite to the patty (e.g., see Example VIII hereof).

The terms "cells" and "cellular," as used herein, include the macroscopic cell-like cavities, tubules or bubbles (e.g., evident upon gross visual examination of the product) which are formed within the mass under the conditions described.

The term "balloon-puffing," as used herein, refers to the forming of cells within a mass by gradual or restricted expansion without significantly rupturing or disrupting the mass or walls as occurs in explosion-puffing. Balloon-puffing may be initiated within a die and may be continued after emergence of the mass from the die. The cells generated within our melt or matrix may constitute, for example, from about 20% to about 60%, or more (e.g., about 20%, 30%, 40%, 50%, 60%, or more) of the volume of the final extrudate. Our products should not be disintegrated by explosion-puffing.

Proteins contain the amino acid cysteine, which under a variety of conditions joins with another cysteine to form cystine, thus forming sulfur-to-sulfur (i.e., disulfide) bonds. At room temperature and in the dry state, the disulfide bonds are quite stable; however, under conditions of high moisture content and high temperature, disulfide bonds may interchange.

A proteinacous material such as defatted soy protein has a cysteine content which provides a sufficiently high density of cross-linking sites, to produce, under our preferred conditions, the formation of a three-dimensional, cross-linked network structure involving disulfide network bonding or cross-linking. Apparently this chemical or molecular interaction and network formation involves rearrangement of disulfide bonds. This disulfide bonding and/or rearrangement which results in our preferred cross-linked network structure significantly occurs within our die assembly, remains significantly intact after retorting, and is distinguishable from (but compatible with and may be supplemental to) calcium bonding. Our preferred network structure has sufficient cross-linking for the product to be considered as having a polymeric network. We refer to this disulfide bonding and/or rearrangement involving cross-linking structurization as producing a vulcanized product.

Surprisingly, our balloon-puffing procedures and conditions appear to provide cross-linked proteinaceous products in which the three-dimensional network formation or structure (i.e., disulfide bonding and/or rearrangement, either with or without calcium bonding) is not destroyed, but remains significantly or substantially intact even after subjecting the product to the rigors of retorting. Those procedures involve converting moist, proteinaceous feed stock into a column of a moist, viscous plastic melt, and advancing the melt under the physically confined conditions of a die. Such cross-linked products may also have desired water absorption properties.

The distinctive characteristics of our preferred structured foams or balloon-puffed proteinaceous products are important. Proteinaceous explosion-puffed products do not have comparable structural integrity which will be retained after retorting.

The density, water absorption capacity, are structural integrity of proteinaceous products are determined herein in accordance with the testing procedures set forth later below under the respective captions "Density Test," "Water Absorption Tests," and "Retorting Test for Structural Integrity," unless otherwise indicated.

In our preferred method, a hot viscous mass, in the form of a column [e.g., solid, tubular (i.e., annular), or helical], such as a column of proteinaceous melt containing a volatile component, is forced or pressed through and from a length of an open-ended die assembly having a die orifice (e.g., at the discharge, downstream end of the die assembly) into a discharge zone. The die assembly includes an open-ended die with a die orifice or opening that is not significantly restricted (or is substantially unrestricted), as shown in the drawings and disclosed. The temperature of the mass in the die assembly is below the applicable boiling point of the volatile component during a portion of its passage through the die assembly (under the temperature-pressure conditions prevailing in that portion), and above (e.g., sufficiently close to or not far above) the applicable boiling point of the volatile component during a later, downstream portion of the confined passage, so that restricted boiling of the volatile comonent occurs within that downstream portion of the die assembly. This results in producing limited, restricted boiling and balloon-puffing (as contrasted with explosion-puffing) before, and, in the making of some such products, after, emergence of the mass from the die orifice.

By "confined," we mean that the column of material is in forced contact with walls of the die assembly.

In our preferred method, the confined melt is worked in the die under conditions which product steam-expanded cells and a three-dimensional network structure involving disulfide bonding. The distinctive network structure of our preferred products has remarkable stability characteristics, and such products retain their structural integrity despite the rigors of retorting.

Heat and pressure are applied to a moist feed stock (e.g., a moist, crumbly, feedable protein mix having proteinaceous material and added water) to convert the feed stock to a viscous plastic melt. Proteinaceous plastic melts formed from protein mixes containing, for example, defatted oil seed vegetable protein, generally have a glassy appearance and an amorphous structure.

The moist feed stock has a volatile component, normally water. Although the moist feed stock may have, for example, as much as about 45% by weight water, based on the total weight of such feed stock, it should not be dough-like at ambient conditions, at least for handling in conventional extrusion assemblies, and the level of water present should not interfere with forming or destroy the desired viscous character of the melt.

During the passage of the hot melt through the die, some of the volatile component is boiled to initiate the formation of balloon-puffed cells within the confined melt.

The cells initially formed within the confined, but advancing, hot melt may provide nuclei for further expansion or balloon-puffing after the product is discharged from the die.

The restricted generation of internal gas (e.g., steam) against the opposed compressive forces in the die is accomplished by control of the temperature-pressure relationship of the advancing mass in the die. Thus, the local pressure exerted by or within the die is, in some region, overcome by the generated gas (e.g., steam) pressure, so as to initiate the forming or generating of cells within the confined, hot melt, even though its temperature may have been lowered. The resulting cellular mass or melt (foraminous melt or matrix) is preferably discharged from the die approximately at or in the vicinity of ambient pressure and at a temperature (when water is the liquid volatile component) sufficiently close to 212°F. to avoid disruptive puffing due to the flashing-off of water.

The temperature-pressure relationship is dependent upon the particular feed stock used, the particular plastic melt formed therefrom, and the size of the extruder assembly used, including the cross-sectional construction, size and shape of the interior of the die. However, the particular conditions used may be determined without more than ordinary skill in view of the description and examples herein given.

Since it is difficult to determine pressure with significant accuracy within a confined column having a small cross-section, and the determination of the temperature within the confined column is also somewhat of an approximation, the simplest control is to bring the temperature at the region of the die orifice to the vicinity of about 212°F. when the volatile component is water. Variations of the outlet temperature relate to the extent of boiling or vaporization of the volatile component both within and outside the die.

In one form of our invention, the advancing column of melt in the die is large enough in cross-section to provide for variations in viscosity and temperature transversely across the column. These variations make possible transverse density variations due to differential steam generation within the confined column, as well as laminar flow, which appear to result in shear-working and stress.

It has also been determined that as a result of such transverse force brought about by our methods, the viscosity of the mass or matrix is increased (stiffened or strengthened), and this appears to inhibit explosion-puffing under conditions where it might otherwise occur. This has particular importance in those instances, such as in Examples I–III hereof, where the die temperature, as measured in the vicinity or region of the die orifice, is about 3° to 33°F. above 212°F. (below 250°F.), and where it is possible that explosion-puffing might otherwise have occurred.

Our product, such as produced in Examples I to VIII, has shown a convex flow profile upon emergence from the die orifice, indicating that the flow of the viscous mass or matrix is non-uniform and less or slower near the die walls than in the center of flow. This results in gradational coaxial flow of the mass along the confined path of flow, sometimes referred to herein as "laminar flow," in a "layered" or "sheet-like" pattern. The terms "layered" or "sheet-like," when used to refer to that pattern, however, do not necessarily means that levels of laminae can be readily peeled from the extrudate or matrix in the form of separate or discrete layers or sheets.

Bubbles generated within the viscous mass apparently develop predominantly longitudinally (along the path of flow). Cells formed within our preferred matrix are normally arranged or organized therein in an oriented manner (e.g., density oriented pattern).

Since our shear-worked matrix or foam defines the walls of the cells generated therein, those cell walls (or preponderance of cells defined by the cell walls) are sometimes referred to as being shear-worked or shear-formed.

An "organized" or "integrated" cellular structure, as those terms are used herein in referring to our expanded food products, is one in which the product has tissue-like texture.

So-called "plexilamellar" or explosion-puffed proteinaceous products may be characterized as having generated cells oriented in an essentially random manner and lacking effective macroscopic organization. Our products of Examples I through VIII hereof have a much more oriented structure or organization than explosion-puffed products. The density of our products may vary (e.g., progressively) along at least one plane thereof. Still further, such products have been described as having macroscopically organized, uniaxial structurization, and may be density oriented or have cells arranged in such a pattern.

Our products of Examples IV–VIII are generally characterized by layered cells shaped and arranged longitudinally in substantially coaxially defined, laminar or sheet-like layers, the transverse or cross-sectional size or diameter of which cells generally decreases away from a central axis or path of extrusion or flow. The density of such products generally decreases (e.g., progressively decreases) away from the extruded surfaces or skin thereof, and generally increases (e.g., progressively increases) away from the central axis or path of extrusion. When a skin is present (e.g., has not been removed as a result of a sizing operation), it is dense (e.g., substantially unexpanded), as compared to interior portions of the product. The outside extruded surface has been characterized as generally having a glassy or vitreous appearance.

The product of Example IX hereof is characterized by having small cells, a uniform density, and layered cells arranged longitudinally.

The proteinaceous source material used in producing the protein mix may include, for example, edible protein-containing material of a desired size or form (e.g., protein meal in the form of flakes or flour), such as vegetable or cereal grain protein materials (e.g., wheat gluten or rice gluten) or defatted or solvent-extracted vegetable oil seed, oleoginous, or cotyledon seed materials (e.g., solvent-extracted soybean protein meal), or combinations thereof, having a protein content (dry weight basis) of about 30% or more, preferably about 40%, 50%, or more. Soy protein concentrates having about 70% protein (dry weight basis) may be used, for example, and such concentrates may have a low or high nitrogen solubility index (i.e., NSI). Furthermore, if desired, a soy protein isolate having a protein content (dry weight basis) of about 90% or more, or commercial casein may be used.

The proteinaceous material used may or may not be in an at least partially neutralized form.

The proteinaceous material itself may provide, in our process, the required disulfide for the autogenous formation of our preferred network structure involving vulcanization or disulfide bonding or cross-linking.

When one wishes to produce a particularly bland, structured proteinaceous product, the proteinaceous material used in the protein mix desirably should have a high protein content. Thus, when defatted soy protein material is used, it is generally desirable to use a bland, neutralized concentrate substantially free of beany or bitter taste-conferring material, such as may be produced in accordance with U.S. Pat. No. 2,881,076 to Sair.

If desired, the protein mix may include or be used with a desired edible amount of cereals, starch, binders, cane sugar, dextrose, vitamins, coloring agents, seasonings or flavoring agents, hydrolyzates, nutrients, or the like, although such special additives are not necesary or essential for producing our product. Those additives may be present with the proteinaceous material when the protein mix is fed to the extruder assembly, or may be added, as desired, after completion of extrusion.

When special additives are employed in our food products, the protein content of the feed stock or protein mix may be varied (e.g., from about 30% to 75%) as desired. For some purposes, we prefer to produce expanded proteinaceous products having about 50% or more by weight protein on a dry weight basis.

It has been found desirable, for some purposes, to include an edible form of available calcium (e.g., calcium ions) in or with the proteinaceous material (e.g., before the protein mix is converted to a viscous melt) for the purpose of imparting a still sturdier structure (e.g., skeleton-like structure) and enhanced textural characteristics to the product. The resulting product, accordingly, can attain a still greater degree of texture, firmness, or chewiness, as demonstrated when the product is later subjected to hydration or rehydration under cooking or retorting conditions.

Small amounts of calcium (e.g., about 2% by weight calcium salt based on the weight of the protein ingredient) may be incorporated into or used with the protein mix in the form of an edible calcium salt, such as dicalcium phosphate dihydrate, calcium chloride, or the like, without imparting an undesired flavor to the product. Calcium tends to enhance the hydrated or rehydrated texture of the product, but also tends to cause some loss of water absorption properties. We can obtain structural integrity without using calcium or other special additives.

By increasing the pH of the protein mix with alkaline material such as trisodium phosphate, one may enhance the hydration properties of the product, subject generally to some reduction in texture.

The protein mix should be in a substantially uniform, moist state and have an effective amount of a suitable volatile component (e.g., water) when or as it is subjected to effective mechanical pressure, heat and shearing action to convert it to a melt (e.g., a substantially homogeneous, moist, viscous plastic melt).

The nature or composition of the feed stock and melt (as well as apparatus and processing conditions) at least in part determine the particular temperatures and/or pressure conditions applied to the die assembly and confined mass or melt.

When one uses, for example, appropriate amounts of proteinaceous material such as defatted soy protein (e.g., flakes or flour) in the feed stock and the feed stock is at least in part moistened with or includes water, a viscous but pressure-flowable hot melt may be produced or formed, for example, at product temperatures of well above about 210°–212°F. (e.g., 2¼great pressure). In our preferred procedure, the temperature of such confined, but advancing, hot melt should be controlled sufficiently by the die assembly, so as to initate the formation of steam-generated cells within the confined, hot melt (preferably, a confined column of hot material) along a length of the die and under the prevailing pressure conditions of the confined melt. Furthermore, the temperature-pressure conditions of such confined, hot melt are deliberately controlled or coordinated within a length of the die, so that balloon-puffing results and the expanded extrudate has a matrix with steam-generated cells therein. During the extrusion of such products into a discharge zone or environment which, for example, is at substantially atmospheric conditions, the temperature at the discharge tip (and mass thereat) of the die (at the region or vicinity of the die orifice) may be controlled, for example, adjusted by being cooled to a temperature sufficiently close to or not far above the applicable boiling point of water (e.g., at or well above about 210° to 212°F., or at from about 210°F. to about 230°F.).

However, if one uses, for example, appropriate amounts of proteinaceous material such as casein, or defatted soy protein isolate in the feed stock and the feed stock is moistened with water, a viscous but pressure-flowable hot melt may be produced or formed, for example, at product temperatures of below about 210°–212°F. (e.g., at about 180°F., or more). The temperature-pressure conditions of such confined, hot melt likewise are deliberately controlled or coordinated within a length of the die. In our preferred procedure, the temperature-pressure conditions of such confined, hot melt are deliberately controlled, so as to initiate the formation of steam-generated cells within the confined, hot melt along a length of the die and under the prevailing pressure conditions, and enhance the moisture penetration properties of the extrudate. During the extrusion of such products into a discharge zone which, for example, is at substantially atmospheric conditions, the temperature at the discharge tip (and mass thereat) may be controlled, for example, adjusted by being heated to a temperature sufficently close to or not far above the applicable boiling point of water (e.g., at or above about 210° to 212°F., or at from about 210°F. to about 230°F.). If the mass is to be discharged from the die under vacuum or pressurized conditions, the temperature of the mass should be correspondingly adjusted.

The amount of volatile liquid or water present in the feed stock during the application of mechanical pressure and mechanical working (e.g., shearing) and heat to convert the feed stock to a hot viscous mass (e.g., plastic melt), the nature of the feed stock material and other desired, added materials which may be blended therewith, and the conditions of temperature-pressure control, pH, mechanical pressure, shearing action, forming, and flow rate, and the nature of the particular type of equipment and processing conditions used, are all inter-related and should be coordinated. Thus, when one operating or processing condition is varied or selected, that variation or selection, in turn, may, and often does, influence other operating or processing conditions. We have found no unusual difficulty in varying our operating conditions to suit or accommodate the use of different feed stocks (e.g., see the Examples, below) and other conditions.

The amount of available water generally should be within the range of about 10% to about 45% by weight, and for some purposes, preferably within the range of about 20% to about 35% by weight, based on the weight of the total moist feed stock or moist protein mix. It is desired not to include so much water as to destroy the integrity of the advancing viscous column. The proteinaceous material(s) used to make up the protein mix may have, for example, as much as about 5% to 15% moisture in the commercial form and, accordingly, only a limited amount of water need be added. Water provides the source for the autogenous generation of steam. The amount of water required to form the steam-generated cells is very small.

A variety of injection molding machines and thermoplastic extrusion and compression molding machines or related equipment may be used, at least in part, in preparing, forming and extruding the hot melt or matrix. One can advantageously use, for example, an extruder having a rotatable screw (e.g., a compression or transfer screw) within a closed, heatable, as well as coolable, barrel and an elongated temperature-pressure controllable die assembly [e.g., appropriately connected to or at the front (outlet) end of the extruder barrel]; and, as described later below, in some instances, the extruder barrel and rotary screw together define a die assembly.

The apparatus should provide means which presses or urges the confined, plastic melt through a length of a die while controlling the temperature-pressure relationship of the melt or matrix. When the melt includes water and is discharged into an atmospheric environment, the die, for example, should be operatively associated with means capable of passing the melt through a length of the die while reducing or diminishing the melt pressure (e.g., generally to or towards the vicinity of atmospheric pressure) and while adjusting the temperature of the confined melt by non-adiabatic means (e.g., to a temperature above but sufficiently close to or not far above the applicable boiling point of water), to produce restricted boiling of water and the formation of steam-generated cells within the confined melt or matrix, and passing the resulting foraminous matrix through a die orifice (e.g., into the discharge zone). As previously stated, balloon-puffing may continue after emergence of the melt or matrix from the die orifice.

With many, if not most, proteinaceous materials, it is necessary to control (e.g., adjust or reduce) the temperature of the hot plastic melt or matrix by using appropriate positive (i.e., non-adiabatic) temperature control means in the desired region(s) of the die assembly. The die assembly may be cooled or heated, or both, and may include a jacket, or tubes through which cooling (e.g., water) or heating (e.g., steam) fluid may be circulated, as desired or necessary.

With such an extruder assembly, the feed material may be pre-mixed and charged into the feed inlet (e.g., hopper) of the barrel of the extruder. Some or all of the volatile component may be present in the feed stock which is charged into the extruder, or, if desired, later added in the extruder.

The rotating screw feeds material to and through the extruder assembly, including the die, at an appropriate flow rate and under appropriate flow conditions. The material may pass, for example, through a temperature controllable die adapter having a restrictive (e.g., funnel-shaped) passageway through which material is forced. Such die adapters lead to a die. The outer diameter of the screw may be greater than the outlet of the die adapter, so that material builds up at the die adapter under significant pressure. The build-up of material fed to the die adapter (e.g., by a rotating screw) may produce the required pressure, for example, from about 450 psig. to about 1,800 psig., as determined by a pressure gauge positioned at the passageway of the die adapter, and the temperature of the die adapter may be, for example, from about 115° to about 160°C. (from about 239° to about 320°F.), as determined by a thermocouple positioned near the passageway of the die adapter. The die forms and shapes the melt which, preferably, forms a column, and, by proper temperature-pressure control, forms a ballon-puffed extrudate. The edible proteinaceous extrudate may be termed as having been cooked, although that extrudate generally is later, further cooked as desired and as a separate processing step.

The cross-sectional area(s) and shape, as well as the length, of the die may vary, as desired or required, such as to impart to the product a circular, oval, rectangular, or annular cross-section. Dies, for example, from about 10 inches to about 24 inches in length have been satisfactory for forming solid, non-spirally shaped columns. The cross-sectional inner diameter of such dies, for example, has satisfactorily been from about ⅜ inch to ¾ inch, and the die has been satisfactorily shaped to provide a rectangular die orifice having internal dimensions of about ¼ inch high and about ½ inch wide.

As shown in the accompanying drawings and Examples herein, our extruder assembly may include, for example, a laboratory Brabender, a Prodex or an Egan extruder connected to an appropriate die adapter, and in some instances, intermediate pieces of connecting equipment (e.g., manifold and connecting lengths and shapes of pipe), one or more connecting die(s), and associated temperature-pressure controls.

We have used satisfactorily an extruder assembly which includes a Sterling extruder (see FIG. 5 and Example IX) which forms a solid, spirally-shaped column. (If desired, that extruder assembly may be fitted, at its discharge end, with a separate, temperature controllable die assembly or die extension having stationary die walls; such separate die assembly may shape the hot melt into an annular form.)

Our extruded products may be sized, dried, and/or frozen, as desired.

The sizing operation reduces the extrudate to the desired size and form of subdivision, and may involve cutting or shaping the product into chunks, granules, beads, or the like. This should be done as the extrudate emerges from the die orifice, or after collection of the extrudate. The emerging product retains enough water and heat to facilitate sizing without rupturing the product or producing much fines. For many purposes, our sized product should have a surface area (specific or bulk surface area) to volume (specific or bulk volume) ratio sufficient to provide good moisture penetration and/or rapid rate of hydration or rehydration (e.g., throughout the product). An edible extrudate which has been sized may be added to other food products, including unexpanded, textured vegetable protein products (e.g., see pending U.S. application Ser. No. 285,422 to Louis Sair and Donald W. Quass filed Aug. 31, 1972) having the desired textural, structural and eating characteristics.

Our product, either sized or unsized, may be dried by conventional means to a desired moisture content (e.g., 5–15%). Drying may be conducted in any suitable manner.

If desired, our product may be chilled or frozen for storage and preservation purposes, and later sliced (e.g., with a bacon slicer) or cut to the desired shape or size, and thawed. Moreover, the moist extrudate may be frozen without prior drying) and may be sized before or after being frozen, as desired.

Our preferred proteinaceous food products have integrated structure, or meat-like or organized tissue-like texture. Such products significantly simulate characteristics (e.g., organization of macro-fibers) found in animal proteins while retaining structural integrity under cooking and even under retoring conditions, such as used in food processing (e.g., without requiring special additives).

Our proteinaceous extrudates customarily have a protein content of at least 30% (e.g., about 40%, 45%, 50%, 55%, or even more) on a dry weight basis. If desired, they may be substantially or essentially free of non-proteinaceous fillers or binders.

Natural food products, including meat or meat-like products, may be supplemented, extended or blended with our edible products, for example, as described in Example VIII hereof. Our edible products, for example, may be used in canned foods and may be cooked or retorted in the can in accordance with customs of the food industry. They may also be used in meat emulsions. Thus, our products may be hydrated or rehydrated and used in the food industry for the same purposes as conventional, textured vegetable protein (e.g., "TVP" products) products, including as an extender or supplement for natural meat or meat-like products or as a meat analog for humans, as well as animals or pets, but we believe them to be both distinctive and superior to textured vegetable protein products heretofore available.

As stated above, our preferred product, when retorted, significantly retains its three-dimensional network structure involving disulfide cross-linking. The remarkable stability of such three-dimensional network structure is demonstrated by the following series of tests.

In conducting these tests, 10 grams of a dry sample of the product to be tested is placed with 80 ml. of water into a 3-ounce can. The can is sealed and its contents retorted at 230°F. for 90 minutes, after which the can is opened and its contents removed for testing purposes.

The next step of the tests involves contacting a portion of the retorted sample with a 6 M guanidine hydrochloride solution buffered at a pH of 8.5 (a thermodynamically good solvent). The addition of this solution assures one that the resulting proteinaceous sample behaves as typical polymer random coilsl [Tanford et al., J. Biol. Chem., 241, 1921 (1968); Tanford et al., J. Amer. Chem. Soc., 89, 729 (1967); Miller et al., Biochemistry, 7, 3925 (1968); Tanford, Advan. Protein Chem., 24, 1 (1970)]. If the sample swells, this indicates significant retention of its three-dimensional network structure; however, if the sample initially swells but soon thereafter substantially dissolves and slumps, this indicates significant destruction of the three-dimensional network structure.

The guanidine hydrochloride solution is then removed from the translucent sample by placing it in water and allowing the guanidine hydrochloride to diffuse out, after which the cellular structure of the product is evident upon gross visual examination, provided the sample significantly retained its three-dimensional network structure when previously treated with guanidine hydrochloride.

When the sample is placed in a solution of 6 M guanidine hydrochloride buffered at a pH of 8.5 and 0.1 M $\beta$-mercaptoethanol (disulfide reducing agent), the product may initially swell as a result of retention of disulfide network structure, but the mercaptoethanol constituent causes the disulfide network formation to be broken, and the product to become substantially solubilized and lose its physically self-supporting network structure and structural form (e.g., significantly deform structurally, slump or collapse). This test confirms that if the sample retained its structural form when previously contacted with guanidine hydrochloride, it did so as a result of its disulfide network structure. (If desired, the mercaptoethanol may be added to the sample previously treated with guanidine hydrochloride; and, when this alternate procedure is followed, comparable results should be obtained.) Upon washing the sample with water to remove the guanidine hydrochloride-mercaptoethanol solution, the original cellular structure of the retorted product is not present (gross visual examination) if such structure is a result of disulfide cross-linking.

Our tests and procedures for determining density, water absorption capacity, and structural integrity of a retorted product (as well as a product subjected to boiling water) follow immediately below.

Density Test

In determining the specific density (as opposed to bulk density) of a sample of the proteinaceous material, a total of 10 gms. of a dried sample of proteinaceous material (having a preferred cubical particle size of about ½ inch to ¾ inch) and 70 ml. of fine sea sand 100% passing through a 40-mesh screen and 100% being retained on an 80-mesh U.S. Standard screen) are added to a conventional, glass, laboratory 100-ml. graduate which is vibrated continuously during such addition by being attached to an electric hammer vibrator. The vibrating action assures intimate contact of the sea sand with all of the pieces of the proteinaceous sample.

Some of the sand is first placed in the graduate, a piece of the proteinaceous sample is placed on the added sand, and that piece of the proteinaceous sample is covered with added sand; this procedure is repeated until all of the remaining pieces of the 10-gm. sample and all of the remaining sand have been added to the graduate, and all of those pieces are completely surrounded with and embedded in the sand. In burying the pieces of the sample in sand, the sand is added at a rate of about 1 ml./sec.

The total volume of the sand plus proteinaceous material is read from the graduate, and the 70 ml. of sand is subtracted from the value to provide the volume, in ml., of the proteinaceous sample.

The density of the proteinaceous sample, in pounds per cubic foot, is then determined in accordance with the following formula:

$$\text{Density in Lbs./Ft.}^{3*} = \frac{\text{10 Gms. of Dry Proteinaceous Material}}{\text{Volume, in Ml., of Dry Proteinaceous Material}} \times 100\%$$

*Conversion factor to obtain pounds per cubic foot.

Water Absorption Tests

Cold water absorption is determined by placing 10 gms. of a dried sample of proteinaceous material in a 250-ml. beaker and adding 150 ml. of tap water. The beaker with its contents is allowed to remain for 1 hr. at room temperature. Upon the lapse of 1 hr., the excess liquid is poured off through a 20-mesh screen. The weight, in grams, of the hydrated proteinaceous material is determined.

The percent of cold water absorption is determined in accordance with the following formula:

$$\%\ \text{Water Absorption} = \frac{\text{Gms. of Hydrated Proteinaceous Material} - \text{10 Gms. of Dry Proteinaceous Material}}{\text{10 Gms. of Dry Proteinaceous Material}} \times 100\%$$

In determining the percent of hot water absorption, the same procedure is followed, however, using 10 gms. of a sample of dry proteinaceous material and 150 ml. of boiling water. The water is removed upon the lapse of 10 min. The percent hot water absorption is determined in accordance with the above formula.

The percent of water absorption under retorting conditions is determined by placing 10 gms. of a sample of dry proteinaceous material and 80 ml. of water in a 3-ounce can, sealing the can, and subjecting the contents of the can to retorting conditions for 90 min. at 230°F. The percent of water absorption is determined in accordance with the above formula.

Retorting Test for Structural Integrity

In determining the integrity of a sample of dried proteinaceous material under retorting conditions, 10 gms. of the dry proteinaceous material which has been cut into chunks (e.g., about ½ inch × ½ inch × ½ inch) are added with 80 ml. of water to a 3-ounce can. The can is then sealed and the contents are retorted at 230°F. for 90 minutes. The can is opened after being cooled.

If the resulting hydrated proteinaceous product, although swollen to an increased size as a result of being retorted, has essentially retained its chunky shape and structure (structural identity) and has an essentially clear broth, then it is deemed to have or to have retained its structural integrity; however, if the resulting hydrated proteinaceous material disintegrates to the extent that it has the consistency of porridge or is mushy and has not substantially retained its coherent, self-supporting, chunky shape and structure (structural identity) and has a very milky broth, it is deemed not to have or not to have retained its structural integrity.

The accompanying diagrammatic drawings (not drawn to scale) are for illustrative purposes only and show certain extruder assemblies which were used in various Examples (or parts thereof) which follow later below.

Figure 1:
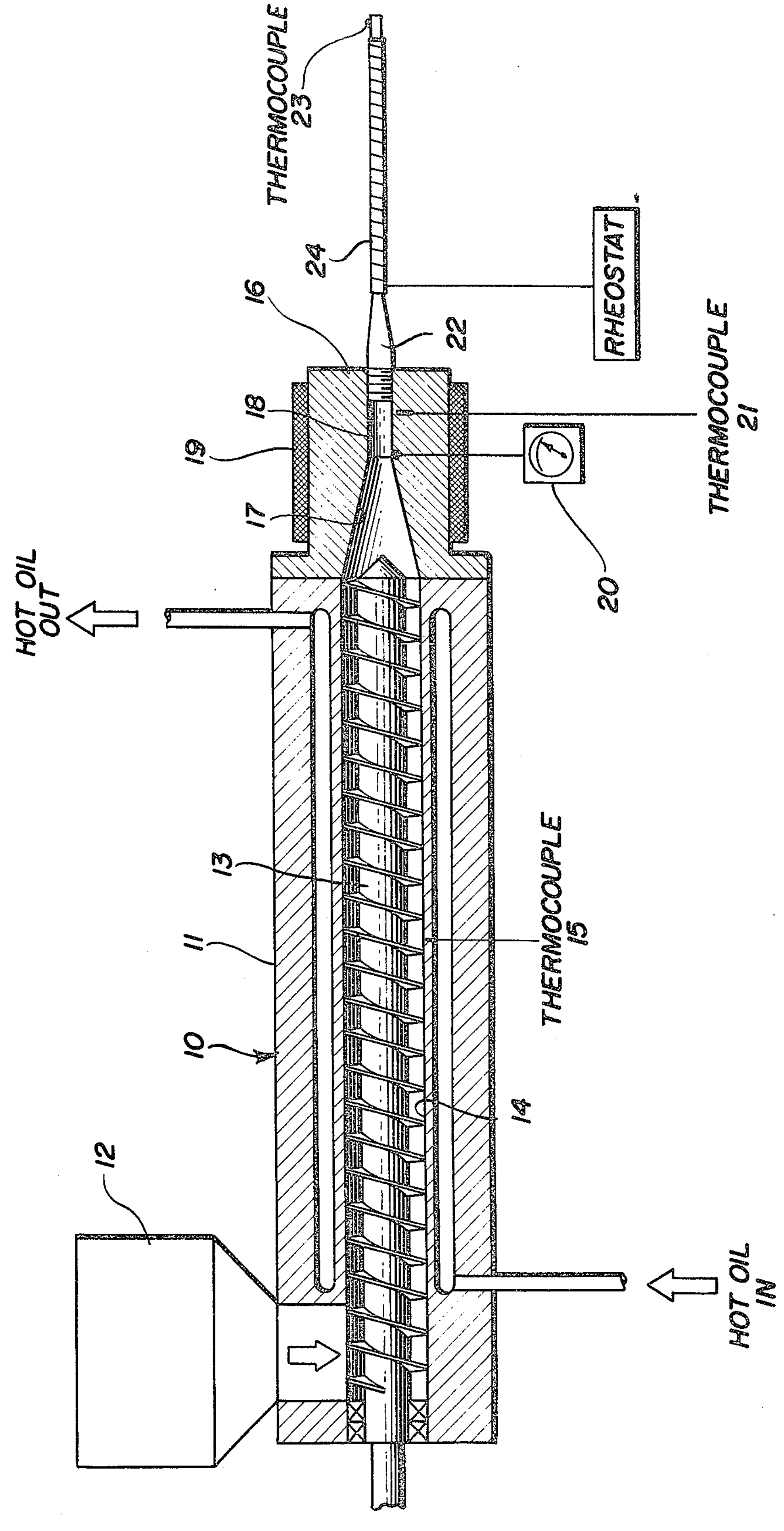
FIG. 1 is a side elevational, partial sectional view of a laboratory Brabender extruder assembly having heating tape wrapped about most of the elongated die, which assembly was used in certain runs referred to in Examples I and II hereof and was used without the heating tape in runs of Example III hereof.

Referring first to FIG. 1, the laboratory Brabender extruder assembly shown therein was used in conducting certain runs of Examples I and II hereof.

The laboratory Brabender extruder 10 shown therein has a horizontally extending, jacketed barrel 11 which is rifled throughout its length. The rifled barrel has an inlet 12 for feeding purposes and houses a rotatable, 1:1 transfer screw 13 which is powered by a 3 HP motor (not shown). The screw 13 feeds material to and through an electrically heatable, die adapter 16. In Examples I and II, the barrel 11 of the extruder was heated by hot oil which was circulated through the barrel jacket. The temperature at which the jacket is maintained is determined by using a thermocouple 15 to measure the temperature of the internal wall 14 of the barrel 11. The internal wall 14 is in direct contact with material being feed through the barrel 11 by the transfer screw 13.

The heatable die adapted 16 has a horizontally extending, funnel-shaped passageway therein, and may be heated by an electrical heating coil or band 19. The passageway has an inlet opening 17 which slopes inwardly to a die entrance 18 which has a pressure gauge 20 positioned thereat. A thermocouple 21 is positioned near the die entrance 18. The die entrance 18 is connected to an elongated, horizontally extending, tubular die 22 from which the extrudate is discharged.

The flattened end of the elongated die 22 issues extrudate in the form of a ribbon. The surface temperature of the tip or outer discharge end of the elongated die 22 is measured using a surface pyrometer having a thermocouple 23 positioned at the tip (at the region of the die orifice) of the die 22. Heating tape 24 is wrapped about most of the elongated die 22 and is shown spaced a short distance rearwardly of the point where the tip temperature of the elongated die 22 is measured by the thermocouple 23. The heating tape 24 reduces the loss of heat from the hot plastic melt passing through the elongated die 22. That is, when the heating tape was used in Examples I and II, the temperature applied by the tape was below that of the elongated die and its contents, and therefore the tape effected controlled cooling thereof.

In operation, the screw 13, which has a ¾to inch diameter and a 24:1 L/D ratio, applies pressure upon the material in the barrel 11 and feeds the material to and through the die adapter 16 and die 22. The build-up of material fed to the die adapter 16 by the transfer screw 13 causes a pressure to be applied on or to the material, as measured by the Bourdan-type pressure gauge 20 of the die adapter 16, which gauge is positioned near the feeding end of the die entrance 18. The temperature of the heated thermocouple pre-heated die adapter is measured by the termocouple 21 positioned near the die entrance 18.

The overall length of the die adapter 16 is about 4⅝ inches. The passageway therein has an inlet opening 17 with a diameter of ¾ inch, which slopes inwardly over a distance of about 2⅜ inches to a die entrance 18 having a diameter of about ⅜ inch and a length of about 2 inches.

The die 22 comprises an elongated, tubular nozzle which is 10 inches long. The die 22, as originally made, had an inner diameter of ⅜ inch and outer diameter of ½ inch; however, the forwardmost 8 inches of length of the die 22 had been flattened, so as to provide a die orifice about ¼ inch high and about ½ inch wide and discharge or issue extrudate in the form of a ribbon.

In Examples I and II, the degree of expansion of the extrudate was controlled either by cooling the die 22 with compressed air (not shown), ambient air (not shown), or by covering most of the die with the electrically heated, heating tape 24 which insulated the die and reduced, but did not eliminate, the cooling thereof. The same assembly shown in FIG. 1 was used in runs of Example III, except the heating tape 24 was not used.

The surface temperature of the tip or outer discharge end or orifice of the elongated die 22 is measured using a surface pyrometer having a Type 4040 Alnor Pyrocon thermocouple 23 of Alnor Instrument Company. The thermocouple 23 is positioned on the die 22 about ¼ inch from the tip thereof. The heating tape 24 is spaced about ½ inch rearwardly of the thermocouple 23.

Figure 2:
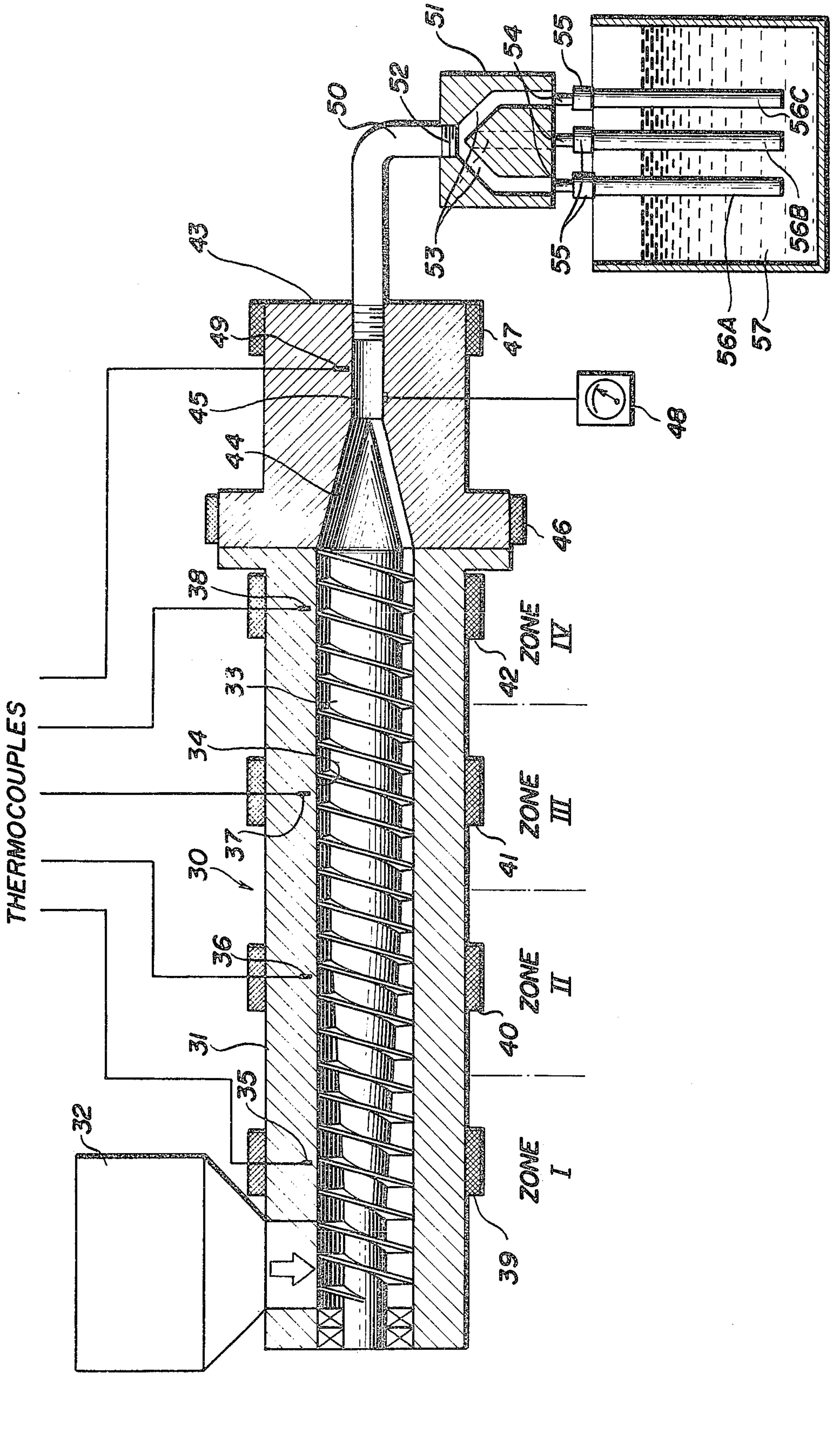
FIG. 2 is a side elevational, partial sectional view of a Prodex extruder assembly showing three elongated dies immersed in water, which assembly was used in Example IV hereof.

The Prodex extruder assembly shown in FIG. 2 was used in Example IV hereof and has three elongated dies partly immersed in water. The same assembly was also used in Examples V and VI hereof, except that (a) four elongated dies were used in Example V and those dies were cooled with compressed air instead of a water bath, and (b) five dies were used in Examples VI and in one run of Example VI those dies were cooled with compressed air (in a second run of Example VI the dies were partly immersed in water).

The Prodex extruder 30 shown therein has a horizontally extending, smooth barrel 31. The barrel 31 has an inlet 32 for feeding purposes and houses a rotatable, medium, 2:1 compression screw 33 which is powered by a 25 HP motor (not shown). The screw 33 feeds material to and through the connecting die adapter 43, 90° elbow 50, manifold 51, and three, elongated dies 56A, 56B, 56C. The barrel has four, electrically heatable zones which are shown as zones I through IV. Each zone may be separately heated, as desired, by electrical heating coils or bands 39, 40, 41, 42. The temperatures at which those zones are maintained are determined by measuring the temperature at the internal barrel wall 34 of those zones by means of thermocouples 35, 36, 37, 38. The internal wall 34 is in direct contact with material fed through the barrel by the screw 33.

The die adapter 43 has a funnel-shaped passageway therein with an inlet opening 44 which slopes inwardly to a die entrance 45. The die adapter 43 may be heated or preheated by electrical heating coils or bands 46, 47. A Bourdon-type pressure gauge 48 is positioned at the die entrance 45. The temperature of the die adapter 43 is measured by the thermocouple 49 positioned near the die entrance 45.

The downwardly directed, 90° elbow 50 connects the die adapter 43 to the vertically extending, cylindrical manifold 51. The manifold 51 may be heated or preheated with steam (not shown). The manifold has an entrance 52 which leads to separate, stream-splitting channels 53. The lower end of the manifold has nipples 54 which are connected to the channels 53. Channels not used are sealed. The nipples 54 connected to the three unsealed channels 53 shown in FIG. 2 are fitted to couplings 55 which, in turn, are fitted to three, vertically extending, elongated dies 56A, 56B, 56C. The discharge ends of the three, vertically extending, elongated dies 56A, 56B, 56C are shown partly immersed in water 57, which constitutes the discharge zone.

In extruding with the Prodex extruder assembly shown in FIG. 2, the feed material is formed into a spirally wound, horizontally extending, viscous plastic melt as it leaves the rotating screw 33. The plastic melt then enters the horizontally extending, connecting, pre-heated die adapter 43, which is part of the Prodex extruder 30. Although the die adapter 43 is equipped with electrical heating means, that heating means applied no heat thereto during the run of Example IV, although the die adapter 43 was pre-heated before the run referred to therein.

More specifically, the screw 33 has a diameter of 2½ inches and a L/D ratio of 24:1. The die adapter 43 has an overall length of about 8½ inches and has an inlet opening 44 with a diameter of about 2½ inches which slopes inwardly over a distance of about 2½ inches to a die entrance 45 having a diameter of about ¾ inch and a length of about 6 inches to provide a die entrance 45. The downwardly directed, 90° elbow 50 has an internal diameter of ¾ inch and is fitted to the ¾ inch, discharge end of the die adapter 43. The lower end of the elbow 50 is connected to the metal, vertically extending, cylindrical, pre-heated manifold 51, which acts as a stream splitter.

The manifold 51 has an outer diameter and vertically extending length of 4 inches. The entrance 52 to the manifold 51 has a diameter of ¾ inch, which extends vertically downwardly about 1¼ inches and then is gradually, radially directed outwardly to ten separate channels 53. Each of the separate channels 53 has an internal diameter of about 3/16 inch and flares downwardly and outwardly over a vertical length of about 2 inches. Except for the entranceway, channels, and circulating steam passages for heating or preheating the manifold (not shown), the manifold 51 is of solid construction.

The lower, discharge end of each channel 53 either is selectively sealed or is connected to an elongated die.

The lower, discharge end of each of the channels 53 receives an end of a vertically extending, ⅜ inch nipple 54 having an overall length of about 2 inches. The lower, discharge end of each of the three selected nipples 54 is fitted with a ¾ inch coupling 55. The couplings 55 are, in turn, fitted to three vertically extending dies 56A, 56B, 56C, each of which dies is 12 inches long and has an internal diameter of ¾ inch.

The outer, vertically extending, dischage end of each of the three elongated dies 56A, 56B, 56C, is immersed in the water bath to depth of about 8 inches. The extrudate is discharged from the open-ended dies directly into the water 57. The temperature of the water may be determined by a thermometer (not shown).

Figures 3, 4:
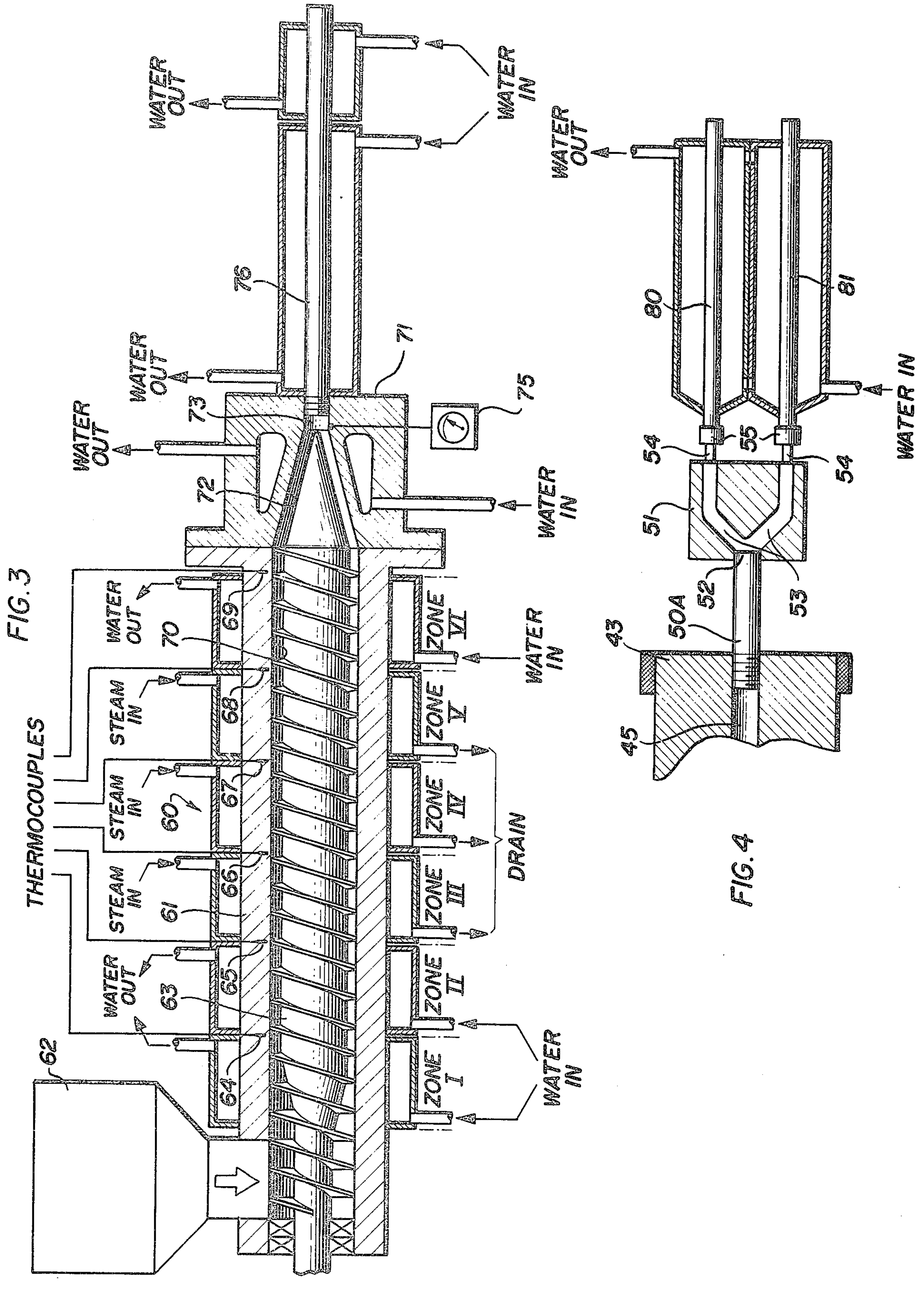
FIG. 3 is a side elevational, partial sectional view of an Egan extruder assembly, which assembly was used in example VII hereof.
FIG. 4 is a fragmentary, side elevational, partial sectional view of a Prodex extruder assembly used in a run referred to in Example VIII hereof.

FIG. 3 shows an Egan extruder assembly which was used in Example VII hereof.

The Egan extruder 60 shown therein has a horizontally extending, jacketed barrel 61 which is rifled (from zones I through IV). The barrel 61 has an inlet 62 for feeding purposes and houses a rotatable, 3:1 compression screw 63 which is powered by a 60 HP motor (not shown). The screw 63 feeds material to and through a heatable die adapter 71. The die adapter has a horizontally extending passageway therein which, in turn, is fitted to a communicating, horizontally extending, elongated die 76.

The barrel 61 has six, separately heatable or coolable zones which are shown as zones I through VI. The interior wall temperatures of those zones are measured by means of thermocouples 64, 65, 66, 67, 68, 69. The interior wall 70 is in direct contact with material fed through the barrel 61 by the screw 63. The barrel 61 has six separate jackets for circulating cooling water or steam to the respective zones. The outlet temperature of cooling water from the jackets of zones I, II and VI are determined by thermometers (not shown) positioned in their respective outlet pipes.

The die adapter 71 has a funnel-shaped passageway therein with an inwardly sloping opening 72 which leads to a die entrance 73. A transducer pressure gauge 75 is positioned at the die entrance 73. In Example VII, the die adapter 71 was pre-heated with steam, but during the run thereof cooling water was circulated through the jacket of the die adapter.

The die adapter 71 is fitted to an elongated, jacketed die 76. Cooling water circulates through the jacket of the elongated die 76.

More specifically, the screw 63 has a diameter of 2½ inches and a L/D ratio of 24:1. The die adapter 71 has an opening 72 of about 2½ inches which slopes inwardly to a diameter of about ¾ inch over a distance of about 3 inches to the opening of the die entrance 73. The die entrance 73 extends about 2 inches. The elongated die 76 is 24 inches long and has an inner diameter of ¾ inch.

FIG. 4 is a fragmentary illustration of a Prodex extruder assembly which was used in producing a product of Example VIII hereof.

The Prodex extruder (not shown), including the powered, medium 2:1 compression screw 33, and die adapter 43 (partly shown) correspond with the Prodex extruder and die adapter shown in FIG. 2; however, the remainder of the assembly, particularly the arrangement thereof, is different. In FIG. 4, the die entrance 45 of the die adapter 43 is aligned with and connected to the horizontally extending, cylindrical manifold 51 by means of a nipple 50A (instead of the 90° elbow 50) which is 2 inches long and has an inner diameter of ¾ inch. The manifold 51 is of the same construction as the manifold shown in FIG. 2. The nipples 54 extending from the two, unsealed manifold channels 53, in turn, are connected to two couplings 55 which, in turn, are connected to two, elongated, jacketed dies 80, 81, each of which has its own water inlet and outlet (the water inlet and water outlet of jacketed dies 80 and 81, respectively, are not shown in FIG. 4).

Each of the elongated dies is cooled with circulating water which passes through the surrounding jacket, is 18 inches long, has an internal diameter of ¾ inch, and has an overall outer diameter of 2 ¼ inches. The inlet temperature of the water may be taken with a thermometer (not shown).

In using the foregoing extrusion assemblies in the respective Examples referred ro above, the heatable die adapters and the manifold (when present) were in a heated or pre-heated state.

Figure 5:
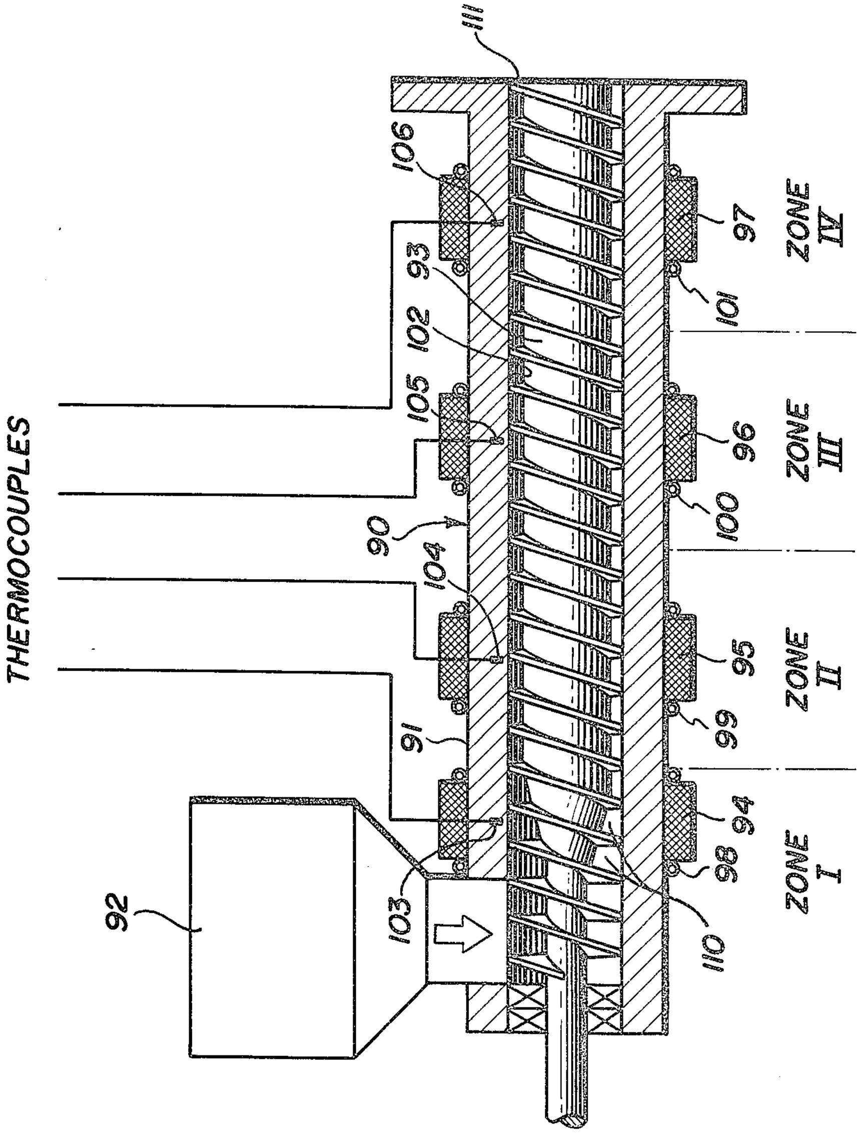
FIG. 5 is a side elevational, partial sectional view of a Sterling extruder assembly which assembly was used in Example IX hereof.

The Sterling extruder assembly 90 shown in FIG. 5 was used in Example IX hereof, and includes, under our controlled, operating conditions, a die assembly. The extruder (without the screw) was made by the Sterling Extruder Corp, and is identified as Model 5000, 4½ inch extruder having a L/D of 24:1. (The screw was constructed to our specifications.)

As shown in FIG. 5, a die assembly need not be stationary. In addition, the moist material fed to it need not be in the form of a hot melt. The internal surface of the extruder barrel 91 defines an outer die wall 102 with straight, longitudinally extending rifling (not shown), and the rotary compression screw 93 defines a rotary, inner die wall. Material is fed to the assembly through the inlet opening 92 of the barrel 91.

The rotary screw 93 is a medium, 3:1 compression screw that is powdered by a 150 HP motor (not shown). The screw has a continuous length of a thread that extends around the core of the screw in spiral convolutions and provides a series of spaced-apart, radially extending flights which define the channel depths (a continuous, spirally wound channel).

The screw has 4 feeding flights, 2 transition flights, and 18 metering flights. The 4 feeding and 2 transition flights are in zone I and the metering flights are in zones II, III and IV. All of the flight tips are flat and contiguous to the outer die wall 102, the clearance being approximately 0.003 inch.

Each flight tip has a land width of 9/16 inch (a flight tip width of ½ inch, as measured perpendicular to the leading and trailing edges of each flight). The channel depths of the feeding and metering flights are about 16 mm. (0.63 inch) and 5 mm. (0.2 inch), respectively. The channel width between flights is 3¾ inches, as measured perpendicular to the flights. The channel depth of the transition channels progressively decreases from the feeding flights to the transition flights.

The outer die wall 102 has an internal diameter of about 4½ inches and is rifled (not shown) from zone I through zone III. The length of the die, as measured from the first to the last flight, is about 9 feet.

The outer die wall 102 and rotary screw 93, together, form, in effect, a die adapter where the open cross-sectional region 110 provided between the outer die wall 102 and the 2 transition flights decreases in depth, and thereafter the space between the outer die wall 102 and the core of the rotary screw 93 provide, in effect, a forming or shaping die.

As the screw 93 rotates, considerable pressure and working and shearing action are exerted upon the advancing material.

The die has four zones, namely zones I–IV, which may be separately or individually heated and/or cooled, as desired and needed. Zones I–IV may be separately heated by electrical heating coils or bands 94, 95, 96 and 97, respectively. Copper tubing 98, 99, 100 and 101 are interspaced with those respective heating means and provide separate means for circulating cooling water to those respective zones, and, more particularly, to assist in controlling the temperature of the outer die wall of those zones. Each of the heating and cooling means for each of the zones is independently and separately controllable. The temperature of the interior portion of the outer die wall 102 of each of zones I–IV is determined by means of thermocouples 103, 104, 105 and 106, respectively. That stationary wall of the die is in direct contact with the material passing through the die.

The screw 93 may be internally cooled with tap water, and was internally cooled in Example IX. The cooling water circulates through a quill (not shown) which extends axially along the length of the screw through zone IV. The hollow screw and rotary union of the quill provide return circulation so that the water is discharged from the same end of the quill through which it entered the screw. The temperature of the water discharged from the screw 93 is measured with a thermometer (not shown).

The material leaving the open-ended die is discharged through the die orifice or cylindrical annulus formed between the discharge or downstream end 111 of the outer die wall 102 and the outer blunt nose of the screw 93.

When the assembly is operating, the melt formed within the die emerges through the die orifice into the atmosphere in the form of a continuous, spirally-shaped ribbon.

Under appropriate operating conditions, a moist, proteinaceous feed stock may be converted within the confines of the die into a moist plastic melt. Although a melt may be partly or wholly formed in zone II, it is certainly present in zones III and IV. The melt present in the metering flights fills the cross-sectional confines of the die.

The Examples set forth below are for purposes of illustration only and the products of our invention and methods for making them are not necessarily limited thereto, and in some instances, at least parts of an Example may indicate processing conditions which should be avoided. In the Examples, density and water absorption values and the determination of structural integrity involves testing essentially dry products, unless otherwise indicated.

EXAMPLE I

The following admixture was uniformly blended and fed to and through the laboratory Brabender extruder 10, die adapter 16, and elongated die 22 shown in FIG. 1:

| Material | Lbs. |
|---|---|
| Soy Flour | 100 |
| Calcium Chloride | 2 |
| Trisodium Phosphate | 1.5 |
| Durkex 500 | 0.5 |
| Caramel Coloring | 1.15 |
| Hydrochloric Acid (Concentrated) | 0.09 |
| Water | 37.9 |

The soy flour used was Soy Flour I–200, a solventextracted soy flour of A. E. Staley Manufacturing Company having a NSI of 60% and protein content of 52%. Durkex 500 is a stabilized vegetable oil of Glidden-Durkee Division, SCM Corporation. The caramel coloring was Sethness B and C Powdered product of Sethness Products Company.

The 1:1 transfer screw 13 of the laboratory Brabender extruder 10 was rotated at 100 rpm. The rifled barrel 11 of the extruder 10 was heated with circulating hot oil to maintain a temperature of 68°C. (154.4°F.) at the internal wall 14 of the barrel as determined by the thermocouple 15. The build-up of material fed to the die adapter 16 by the transfer screw 13 caused a pressure of 250 psig., as determined by the pressure gauge 20 of the die adapter 16, to be applied to the protein mix. The temperature of the heated die adapter 16, as determined by the thermocouple 21 which was positioned near the die entrance 18 thereof, was 150°C. (302°F.).

The degree of expansion of the extrudate was controlled either by cooling the die 22 with compressed air, ambient air, or, as shown in FIG. 1, by covering most of the die 22 with electrically heated, heating tape 24 which insulated the die and reduced, but did not eliminate, the cooling of the die and its contents. In all instances in which the desired product was made, the amount of cooling effected was such as to produce a zone near or at the discharge orifice of the die 22 having a temperature somwhat above 212°F. and a pressure which would permit some steam to be formed within the die 22.

Four different experimental runs (i.e., Runs 1–4) were made with the foregoing admixture. In those runs, the temperature varied at the tip of the die 22, as determined by the thermocouple 23 positioned at the region of the die orifice. The extrudate products of Rins 1–4 were cut into chunks of about ½ inch × ¼ inch × ½ inch.

The conditions and results of those runs are shown in Table 1, below, and, as shown in that Table, the extruded products were compared with a commercial "TVP," extrusion-puffed (explosion-puffed), No. 10 product of Archer-Daniels-Midland Company having chunks with dimensions of about ⅜ inch × ⅜ inch × ½ inch.

outside surface (e.g., substantially unexpanded, glassy skin) thereof; when such density oriented extrudates are subdivided, the density of the subdivided particles or chunks progressively varies along at lease one plane. Extrudates having such organized, uniaxial cellular structure are still further characterized by good texture and as having the tenderness, as well as the toughness or chewiness, associated with natural meat tissue.

Food products which are intended to simulate natural meat should have good texture, as well as good water absorption capacity, and one should avoid uncontrolled or explosion-puffing, which produces products which, upon being cooked or retorted in water, do not have good structural integrity and sturdy, well-defined cell walls, and become mushy or pulpy.

Table 2, below, shows the effect of controlling the degree of expansion, and, more specifically, shows the relationship of density to the textural and structural characteristics of the extruded products of Runs 1–4 and the commerical "TVP" product after the extrudates thereof were subjected to retorting conditions.

Table 1

| Run No. | Temperature Control Applied to the Die | Temperature of the Tip of the Die | Density of Extrudate | Percent Water Absorption Cold Water | Hot Water | Retorting |
|---|---|---|---|---|---|---|
| 1 | Cooling with compressed air at 30 psi. | 150°F. | 89 lbs/ft³ | 17% | 43% | 123% |
| 2 | Cooling with ambient air. | 215°F. | 73.4 lbs/ft³ | 34% | 69% | 163% |
| 3 | Electrically heated, heating tape applied to die.* | 235°F. | 52 lbs/ft³ | 65% | 144% | 237% |
| 4 | More heat applied (by adjustment of a rheostat) to electrically heated, heating tape on die.* | 240°F. | 31 lbs/ft³ | 186% | 304% | 329% |
| — | "TVP" extrusion-puffed product. | — | 31.5 lbs/ft³ | 184% | 300% | 364% |

*The heating tape reduced the loss of heat from the hot plastic melt passing through the die. That is, the temperature applied by the heating tape was below that of the die and its contents, and it therefore effected cooling.

Table 1, above, shows that by allowing the extrudate to expand without explosion-puffing (explosion-puffing disrupts the formation of our organized, steam-generated cellular structure and produces products having generated cells oriented in an essentially random manner and lacking macroscopic organization) and to develop steam-generated, macroscopic tubules or cells, the density of the extrudate decreases, its porosity increases, its ease of hydration increases, and one obtains a substantial improvement in water absorption capacity. Moreover, as the amount of such controlled expansion is increased, these differences become more pronounced.

Our process involving controlled expansion produces, among other things, substantially homogeneous, expanded, cooked, edible proteinaceous extrudates having tissue-like texture and a matrix with steam-generated cells therein. The cells of such preferred products are characterized by being shaped and arranged so as to define organized, uniaxial structurization having a layered cell arrangement. The cross-sectional or transverse diameter or size of cells in such layers decreases with increasing distance away from the central axis of extrusion. Accordingly, the density of such products, as extruded, decreases away from the Table 2

| Products | Density | Textural and Structural Characteristics After Retorting |
|---|---|---|
| Run 1 | 89 lbs/ft³ | Essentially unexpanded. Excellent structural integrity. The product is dry to the taste and hydrated throughout its cross section. |
| Run 2 | 73.4 lbs/ft³ | Excellent structural integrity. Somewhat dry to the taste. Uniformity of hydration throughout its cross section. |
| Run 3 | 52 lbs/ft³ | Good structural integrity. Good textural qualities. Uniformity of hydration throughout its cross section. |
| Run 4 | 31 lbs/ft³ | Some breakdown in structural integrity. Somewhat spongy textural qualities. Very moist and soft. |
| "TVP" Product | 31.5 lbs/ft³ | Breakdown in structural integrity. Very soft, pulpy and foam-like. Poor textural qualities and mushy. |

Natural meat relied upon for chewiness has three-dimensional integrity. It is not merely formed of striated, skeletal muscle fibers positioned adjacent to each other, but has muscle fibers (positioned adjacent to each other) which are cross-connected by strands of connective tissue. Explosion-puffing not only weakens any protein matrix which may be present, but, in addition, fails to provide the shear and stress working of such matrix as occurs within the die in our procedure, and does not form steam-generated cells or autogeneously-produced bubbles by balloon-puffing, as we do.

With our balloon-puffed products, the degree of expansion one desires may be related to the particle size of the extrudate. If the extrudate, for example, is subdivided by being passed through a ¼-inch meat grinder plate, the relatively small size of the subdivided particles is such that hydration readily occurs with less expansion.

In making larger chunks of our balloon-puffed or expanded extrudate, one may prefer that the density of the extrudate be, for example, approximately 50 lbs./ft.$^3$, or at least 40 lbs./ft.$^3$, or not more than 65 lbs./ft.$^3$

Example II

The following admixture was blended uniformly and fed to and through the laboratory Brabender extruder assemblies of Example I (see FIG. 1), above, and the operating conditions were essentially the same as Example I unless otherwise expressly indicated:

| Materials | |
|---|---|
| Wheat Gluten | 100 lbs. |
| Water | 20 lbs. |

The wheat gluten used was devitalized wheat gluten from Japan having 82% protein.

The 1:1 transfer screw 13 of the laboratory Brabender extruder 10, shown in FIG. 1, was rotated at 25 rpm., and the feed rate was 3.5 lbs./hr. on a wet basis and 2.9 lbs./hr. on a dry basis. The barrel 11 of the extruder 10 was heated with hot oil to maintain a temperature of 87°C. (188.6°F.) at the internal wall 14 of the barrel 11, as determined by the thermocouple 15. The build-up of material fed to the die adapter 16 by the transfer screw 13 caused a pressure of 450 psig., as determined by the pressure gauge 20 of the die adapter 16, to be applied to the protein mix. The temperature of the heated die adapter 16, as determined by the thermocouple 21 which was positioned near the die entrance 18 thereof, was 160°C. (320°F.).

Three different experimental runs were made with the foregoing admixture. In those runs, the temperature of the tip of the die 22, as determined by the thermocouple 23, varied in much the same manner as in Example I.

The extrudates of all three runs (i.e., Runs 1–3) were cut into chunks of about ½ inch × ¼ inch × ½ inch.

The conditions and results of those runs are shown in Table 3, below.

Table 3

| Run No. | Temperature Control Applied to the Die | Temperature of the Tip of the Die | Density of Extrudate | Percent Water Absorption Cold Water | Hot Water | Retorting |
|---|---|---|---|---|---|---|
| 1 | Cooling with compressed air at 12 psi. | 145°F. | 89 lbs/ft$^3$ | 16% | 34% | 148% |
| 2 | Cooling with ambient air. | 220°F. | 83 lbs/ft$^3$ | 15% | 30% | 150% |
| 3 | Electrically heated, heating tape applied to die.* | 245°F. | 48 lbs/ft$^3$ | 68% | 112% | 199% |

*The heating tape reduced the loss of heat from the hot plastic melt passing through the die. That is, the temperature applied by the heating tape was below that of the die and its contents, and it therefore effected cooling.

Table 4, below, shows the relationship of density to the textural and structural characteristics of the extruded products of Runs 1–3 after the extrudates were subjected to retorting conditions.

More specifically, Table 4 shows that the balloon-puffed product of Run 3 had good textural and structural characteristics after being retorted, and was uniformly hydrated throughout its cross-section.

Table 4

| Products | Density | Textural and Structural Characteristics After Retorting |
|---|---|---|
| Run 1 | 89 lbs/ft$^3$ | Essentially unexpanded. Excellent structural integrity. The product is dry to the taste. Not uniformly hydrated throughout its cross section. |
| Run 2 | 83 lbs/ft$^3$ | Excellent structural integrity. Dry to the taste. Not uniformly hydrated throughout its cross section. |
| Run 3 | 48 lbs/ft$^3$ | Good structural integrity. More moist to the taste. Uniformity of hydration throughout its cross section |

With our balloon-puffed or expanded, proteinaceous products, the degree of expansion desired may be inversely related to the size of the extrudate particles desired.

Example III

The following admixture was blended uniformly and fed to and through the laboratory Brabender extruder 10, die adapter 16, and elongated die 22 of Example I (see FIG. 1), above, and the operating conditions were essentially the same as Example I (except no run was conducted using heating tape wrapped around the elongated die) unless otherwise expressly indicated:

| Materials | |
|---|---|
| Rice Gluten | 100 lbs. |
| 50% Sodium Hydroxide Solution | 3 lbs. |
| Water | 48 lbs. |

The rice gluten used was devitalized rice gluten having 82% protein.

The 1:1 transfer screw 13 of the laboratory Brabender extruder 10, shown in FIG. 1, was rotated at 50 rpm., and the feed rate was 2.8 lbs./hr. on a wet basis and 2 lbs./hr. on a dry basis. The barrel 11 of the extruder 10 was heated with hot oil to maintain a temperature of 80°C (176°F) at the internal wall 14 of the barrel 11, as determined by the thermocouple 15. The build-up of material fed to the die adapter 16 by the transfer screw 13 caused a pressure of 420 psig., as determined by the pressure gauge 20 of the die adapter 16, to be applied to the protein mix. The temperature of the heated die adapter 16, as determined by the thermocouple 21 which was positioned near the die entrance 18 thereof, was 157°C. (314.6°F.).

Two different experimental runs were made with the foregoing admixture. In one run, the die 22 was cooled with compressed air, and in the other run ambient air was used. The temperature at the tip of the die 22 was determined by the thermocouple 23.

The glassy extrudates of both runs were cut into chunks of about ½ inch × ¼ inch × ½ inch.

The conditions and results of those runs are shown in Table 5, below.

Table 5

| Run No. | Temperature Control Applied to the Die | Temperature of the Tip of the Die | Density of Extrudate | Percent Water Absorption Cold Water | Percent Water Absorption Retorting |
|---|---|---|---|---|---|
| 1 | Cooling with compressed air at 26 psi. | 155°F. | 96 lbs/ft$^3$ | 10% | 97% |
| 2 | Cooling with ambient air. | 230°F. | 62.4 lbs/ft$^3$ | 21% | 139% |

Table 6, below, shows the relationship of density to textural and structural characteristics for the products of Runs 1 and 2 after retorting.

Table 6

| Products | Density | Textural and Structural Characteristics After Retorting |
|---|---|---|
| Run 1 | 96 lbs/ft$^3$ | Essentially unexpanded. Excellent structural integrity. Quite dry to the taste. Some uniformity of hydration throughout its cross section. Quite tough. |
| Run 2 | 62.4 lbs/ft$^3$ | Excellent structural integrity. Uniformity of hydration throughout its cross section. Substantially improved textural eating characteristics. |

EXAMPLE IV

The following admixture was blended uniformly and fed to and through the Prodex extruder 30, die adapter 43, elbow 50, manifold 51, and three elongated dies 56A, 56B, 56C into the water 57, as shown in FIG. 2, to produce a steam-expanded extrudate:

| Materials | | |
|---|---|---|
| Soy Flour | 200 | lbs. |
| Trisodium Phosphate | 4 | lbs. |
| Water | 75.8 | lbs. |
| Iron Oxide | 0.6 | lb. |

The soy flour used was Soy Flour I-200. The iron oxide used was RU 5098, a product of Pfizer Minerals, Pigments and Metals.

The medium, 2:1 compression screw 33 of the Prodex extruder 30, shown in FIG. 2, was rotated at 270 rpm. with a 25 HP motor using about 40 amps. The feed rate was 400 lbs./hr. on a wet basis and about 280 lbs./hr. on a dry basis. The internal wall 34 of zone II of the extruder barrel 31 was maintained at a temperature of 150°C. (302°F.), as determined by the thermocouple 36. During the run, no additional heat was electrically applied beyond zone II of the extruder barrel 31. A small electric fan (not shown in FIG. 2) was directed onto zone III throughout the run to reduce and maintain the barrel wall temperature at 100°C. (212°F.) in that zone. The temperature of the die adapter 43, as determined by the thermocouple 49 positioned near the die entrance 45 thereof, was in the range of from 115° to 140°C. (239° to 284°F.). The outer, vertically extending, discharge end of each of the three elongated dies 56A, 56B, 56C was partly immersed to a depth of about 8 inches in cooling water 57 having a temperature of 170°F. during the run. The glassy extrudate from the run was thus discharged from the three elongated dies 56A, 56B, 56C directly into the water (discharge zone).

The glassy extrudate came out of the three elongated dies almost like sausage and with controlled and limited expansion.

A sample of the extrudate produced in this run was ground through a meat grinder plate having holes ⅜ inch in diameter. That sample had a density of 54.3 lbs./ft.$^3$ and a cold water absorption value of 227%.

Another sample of the extrudate was ground in a meat grinder having a large kidney plate having three kidney-shaped holes of about 1¾ inches × about ¾ inch, to produce large chunks (about ½ inch × ¾ inch × 1¼ inches) of the expanded product. That product had a density of 52 lbs./ft.$^3$ and a cold water absorption value of 214%.

A commercial, extrusion-puffed, No. 10 "TVP," soy protein product (chunks about ⅜ inch × ⅜ inch × ½ inch) of Archer-Daniels-Midland Company, used for comparison purposes, had a density of 32 lbs./ft.$^3$ and a cold water absorption value of 229%.

Upon immersing the large chunks of our extrudate product (ground through the large kidney plate) in boiling water for 10 minutes, the resulting hydrated product had a distinctively layered, meat-like texture or structure which could be peeled in strips or sheets, whereas the commercial "TVP" product, when treated in a like manner, was decidedly more fibrous and was spongy, and did not have good textural or meat-like characteristics.

EXAMPLE V

The following admixture was blended uniformly and fed to and through the Prodex extruder assembly of Example IV, above, except four elongated dies were used, instead of three dies, and those four dies were cooled with compressed air instead of a water bath. The operating conditions were essentially the same as Example IV unless otherwise expressly indicated:

| Materials | |
|---|---|
| Neutralized, Soy Protein Concentrate | 100 lbs. |
| Water | 45 lbs. |

The neutralized, soy protein concentrate used was "GL-301" concentrate of The Griffith Laboratories, Inc. (see U.S. Pat. No. 2,881,076 to Sair).

The medium, 2:1 compression screw 33 of the Prodex extruder 30, shown in FIG. 2, was rotated at 90 rpm. with a 25 HP motor (not shown) using about 23 amps. The internal wall 34 of zones I–IV of the extruder barrel 31 was maintained at temperatures of 40°C. (104°F.), 125°C. (257°F.), 150°C. (302°F.) and 145°C. (293°F.), as determined by thermocouples 35, 36, 37 and 38, respectively. During the run, no additional heat was electrically applied beyond zone III of the extruder barrel 31. A small electric fan (not shown in FIG. 2) was directed onto zone IV throughout the run to reduce and maintain the barrel wall temperature at 145°C. (293°F.) in that zone. The temperature of the die adapter 43, as determined by the thermocouple 49 positioned near the die entrance 45 thereof, was 146°C. (294.8°F.). The four elongated dies were cooled with compressed air, instead of water, during the run.

Our expanded product of this Example had a density of 37 lbs./ft.$^3$, as compared to (a) a density of approximately 90 lbs./ft.$^3$, or more, for an unexpanded extrudate made in accordance with now pending application Ser. No. 285,422 to Louis Sair and Donald W. Quass, filed Aug. 31, 1972, which application is expressly incorporated herein by reference for purpose of this Example, and (b) a density of 32.5 lbs./ft.$^3$ for the commercial, extrusion-puffed, fibrous, No. 10 "TVP," soy protein product (chunks about ⅜ inch × ⅜ inch × ½ inch) of Archer-Daniels-Midland Company.

Our extrudate of this Example was cut to form large chunks having dimensions of about 178 inch × ¾ inch × ¾ inch.

The large chunks of our product and of the commercial "TVP" product were then each subjected to retorting conditions and were compared. The chunks produced from this Example had 287% moisture absorption, which is much higher than is obtained with large chunks of glassy extrudate made in accordance with said application Ser. No. 285,422. The commercial "TVP" product had 380% water absorption.

However, chunks of the commercial "TVP" product had a fibrous appearance and did not retain their shape, and became spongy. In contrast, our extrudate had good structural integrity, had a layered or sheet-like structure that could be peeled apart, and more closely resembled natural meat.

EXAMPLE VI

The following admixture was blended uniformly and fed to and through the Prodex extruder assembly of Example IV, above, except five elongated dies were used, instead of three dies, in Run 1 the five dies were immersed in a selected depth of water, and in Run 2 the five dies were cooled with compressed air instead of a water bath. The operating conditions were essentially the same as Example IV unless otherwise expressly indicated:

| Materials | | |
|---|---|---|
| Soy Flour | 200 | lbs. |
| Trisodium Phosphate | 4 | lbs. |
| Water | 75.8 | lb. |
| Iron Oxide | 0.6 | lb. |

The soy flour was Soy Flour I-200 and the iron oxide was RU 5098.

In the two runs of this Example, the medium, 2:1 compression screw 33 of the Prodex extruder 30, shown in FIG. 2, was rotated at 185 rpm. with a 25 HP motor (not shown) using about 35 amps. The feed rate was 400 lbs./hr. on a wet basis and 280 lbs./hr. on a dry basis. The internal wall 34 of zones I–IV of the extruder barrel 31 was maintained at temperatures of 80°C. (176°F.), 130°C. (266°F.), 150°C. (302°F.) and 145°C. (293°F.), as determined by thermocouples 35, 36, 37 and 38, respectively. During the run, no additional heat was electrically applied beyond zone III of the extruder barrel 31. A small electric fan (not shown in FIG. 2) was directed onto zone IV throughout the run to reduce and maintain the barrel wall temperature at 145°C. (293°F.) in that zone. The temperature of the die adapter 43, as determined by the thermocouple 49 positioned near the die entrance 45 thereof, was 145°C. (293°F.). In Run 1, the outer, vertically extending, discharge end of each of the five elongated dies was partly immersed (to a selected depth) in cooling water. The glassy extrudate from Run 1 was thus discharged from the five dies directly into the water. In Run 2, the five dies were cooled with compressed air, instead of water, during the run.

The resulting expanded products of Runs 1 and 2 were ground in a meat grinder having the large kidney plate referred to in Example IV, above. The product of Run 1 had a density of 56.7 lbs./ft.$^3$ The density of the product of Run 2 was 28.4 lbs./ft.$^3$ An histological and microscopic examination was made of the chunks of the products of Runs 1 and 2, and the commercial, No. 10 "TVP" product (chunks of about ⅜ inch × ⅜ inch × ½ inch) of Archer-Daniels-Midland Company for comparison purposes. In this examination, the products that were compared were as follows:

Run 1 — Product having a density of 56.7 lbs./ft.$^3$;

Run 2 — Product having a density of 28.4 lbs./ft.$^3$;

Commercial "TVP" Product - Commercial, puffed product having a density of 31.5 lbs/ft.$^3$ Upon gross visual examination of chunks of those products, a sample of the product of Run 1 showed some fracture planes in a rather semicircular orientation, but the material lying between the planes appeared to be solid and dense. The sample of the more expanded product of Run 2 showed many spaces (honeycomb), with the material formed around the spaces again being quite solid and dense. The sample of the puffed, commercial "TVP" product was definitely fibrous and rather open appearing.

Samples of the foregoing products were rehydrated overnight in water at about 40°F. Gross visual examination then showed that the Run 1 sample, while still dense and solid appearing, could be pulled apart in sheets (not fibers) along the semicircular fracture planes (as described above). The Run 2 sample, although not floating on the surface of the water, did appear to be rather bouyant and had expanded during rehydration; its honeycomb appearance was obvious and it too could be separated into sheets of non-fibrous appearing material similar to that of the sample from Run 1. The commercial "TVP" sample had expanded markedly, was still on the surface of the water, and when torn apart, was stringy and fibrous.

From the rehydrated chunks, samples of approximately 1 cm.$^3$ were cut. These cut samples were frozen in isopentane chilled with liquid nitrogen, sectioned 10$\mu$ thick in a cryostat, stained with Harris hemotoxylin, and examined microscopically. Magnified photographs of the samples were taken.

Some obvious differences between the samples were apparent during sectioning. The samples from Runs 1 and 2 sectioned smoothly and the materials composing each section were apparently bound together quite well. The commercial "TVP" sample was difficult to handle in that the section came off as distinct strands or fibers which were sticky and difficult to pick up from the blade.

Microscopic examination showed that the Run 1 sample was (in areas) rather homogeneous, but near the surface the material became more longitudinally oriented. The Run 2 sample showed a further extension of the structure of the Run 1 sample with rather homogeneous areas intermingled with areas showing a definite longitudinal orientation. Neither of the samples from Runs 1 or 2 showed the distinct long strands that were obvious from the commercial "TVP" sample, even though they did reveal what could be termed fibers or strands in certain areas only. The commercial "TVP" sample was clearly and distinctly composed of long strands or fibers, and, in some areas, the fibers were bound into areas that, while still being fibrous, were united together around small oval-shaped openings.

Based on the foregoing, the expanded product, even when expanded to a density as low as about 28 lbs./ft.$^3$, showed significant structural characteristics which distinguished it from the commercial "TVP" product. These differences may be likened to the difference between unvulcanized rubber and vulcanized rubber, in that substantial transverse strength or apparent cross-linking has occurred.

EXAMPLE VII

The following admixture was blended uniformly and fed to and through the Egan extruder 60, die adapter 71, and elongated jacketed die 76 shown in FIG. 3:

| Materials | | |
|---|---|---|
| Soy Flour | 100 | lbs. |
| Calcium Chloride | 2 | lbs. |
| Trisodium Phosphate | 1.5 | lbs. |
| Durkex 500 | 1.5 | lbs. |
| Caramel Coloring | 1.0 | lbs. |
| Total Water Present | 32.5 | lbs. |

The soy flour was Soy Flour I-200. The Durkex 500 material used was a stabilized vegetable oil. The caramel coloring used was Sethness B and C Powdered product.

In preparing the admixture, the solid ingredients were first admixed, and the vegetable oil and water were added thereto and mixed therewith as the feed admixture was conveyed to the Egan extruder 60.

The 3:1 compression screw 63 of the Egan extruder 60, shown in FIG. 3, was rotated at 122 rpm. with a 60 HP motor (not shown) using 440 volts, 31.8 amps and 0.140 kilowats. The feed rate was about 95 lbs./hr. on a dry basis. Cooling water was circulated through the jackets of zones I and II of the barrel 61 of the extruder 60, and was discharged therefrom at temperatures of 50° and 62°F., respectively. The internal wall temperatures of zones I and II of the barrel 61 were maintained at 92°F. and 95°F., as determined by thermocouples 64 and 65, respectively. Zones III, Iv and V were heated with steam at pressures of 120 psig., 242 psig. and 68 psig., respectively. The internal barrel wall temperatures of zones III, IV and V were 305°F., 380°F. and 321°F., as determined by thermocouples 66, 67 and 68, respectively. Cooling water was circulated through the jacket of zone VI, and was discharged therefrom at a temperature 60°F. The internal wall temperature of zone VI was maintained at a temperature of 130°F., as determined by the thermocouple 69. The build-up of material fed to the die adapter 71 by the compression screw 63 caused a pressure of 1,800 psig., as determined by the pressure gauge 75 of the die adapter 71, to be applied to the protein mix. Cooling water having an inlet temperature of 150°F. and outlet temperature of 205°F., as measured by thermometers (not shown in FIG. 3), was circulated throught the jacket of the elongated die 76.

The extrudate so produced was in the general shape of sausage, and had a diameter of about ¾ to 1 inch, and was cut by a cutter positioned at the discharge end of the extruder, so as to cut the extrudate into lengths of about 1 inch.

The density of the expanded product was 59.4 lbs./ft.$^3$

A sample of large chunks of the extrudate was placed in boiling water for 30 min. Another sample of the chunks was subjected to retorting conditions.

The chunks which were subjected to boiling in water had a water absorption value of 130%, whereas the retorted chunks had a water absorption value of 209%. Both samples of the hydrated products had good and very uniform hydration characteristics throughout their cross section, had excellent texture and feel in the mouth, and closely resembled, in both physical appearance and feel, natural meat. The hydration value obtained by subjecting the product to retorting conditions was excellent, and higher than was obtained by immersing the chunks in boiling water.

EXAMPLE VIII

The following admixtures was uniformly blended before being fed to and through the Prodex extruder 30 (see FIG. 2), die adapter 43 (see FIGS. 2 and 4), manifold 51 (see FIG. 4), and two, elongated, horizontally extending, jacketed dies 80 and 81 (see FIG. 4):

| Materials | | |
|---|---|---|
| Soy Flour | 100 | lbs. |
| Calcium Chloride | 2 | lbs. |
| Trisodium Phosphate | 0.5 | lb. |
| Durkex 500 | 0.5 | lb. |
| Water | 35 | lbs. |

The soy flour was Soy Flour I-200. Durkex 500 was a stabilized vegetable oil.

The solid ingredients were blended with the soy flour and Durkex 500 oil, and the blend was fed to a turbulizer, where the water was added. The resulting admixture was then fed to the Prodex extruder 30.

The medium, 2:1 compression screw 33 of the Prodex extruder 30, shown in FIG. 2, was rotated at 230 rpm. with a 25 HP motor (not shown) using about 30 to 40 amps. The feed rate was 140 lbs./hr. on a wet basis and 100 lbs./hr. on a dry basis. The internal wall 34 of zones I–IV of the extruder barrel 31 was maintained at temperatures of 100°C. (212°F.), 150°C. (320°F.), 135°C. (275°F.) and 138°C. (280.4°F.), as determined by the thermocouples 35, 36, 37 and 38, respectively. During the run, no additional heat was electrically applied beyond zone II of the extruder barrel 31. A small electric fan (not shown in FIGS. 2 or 4) was directed onto zones III and IV throughout the run to reduce and maintain the barrel wall temperatures at 135°C. (275°F.) and 138°C. (280.4°F.) in those zones. The build-up of material fed to the die adapter 43 by the compression screw 33 caused a pressure of 1,750 psig., as determined by the pressure gauge 48 of the die adapter 43, to be applied to the protein mix. The temperature of the die adapter 43, as determined by the thermocouple 49 positioned near the die entrance 45 thereof, was 145°C. (293°F.). The two, elongated, horizontally extending dies 80, 81, shown in FIG. 4, were cooled with circulating water having an inlet temperature of 170°F., as determined by a thermometer (not shown in FIG. 4).

The product was discharged uniformly and resembled a sausage, had a diameter slightly greater than ¾ inch, and had steam-induced cells throughout its interior, but had a dense, substantially unexpanded, glassy skin.

The extrudate was placed in boiling water for 5 min. to facilitate grinding and was then passed through a meat grinder with holes of ¾ inch diameter. Such use of boiling water facilitates the subdividing of the extrudate and reduces the generation of fines (this procedure for preparing the extrudate for grinding was also used in Examples IV and VI, above). The product passed through the grinder much as if it had been a mass of natural meat. The grinder formed chunks of irregular shapes, which is desired.

The dried, expanded extrudate had a density of 43 lbs./ft.$^3$ and exhibited 200% water absorption after being immersed in hot water for 10 min.

The dried, hydratable chunks were incorporated into the following meat patty mix in accordance with the procedure described later below:

| Materials | | |
|---|---|---|
| Ground Meat | 60 | lbs. |
| Out Product with Steam-Generated Cells | 13.3 | lbs. |
| Seasoning | 1 | lb. |
| Salt | 1 | lb. |
| Water | 26.6 | lbs. |

In preparing the above meat patty mix, water was added to chunks of the expanded product of this Example and the moistened chunks were allowed to soak for 10 min. The materials of the mix were uniformly blended by being passed through a meat grinder having a plate with holes of ⅛ inch diameter. The extrudate blended very well.

The same blending procedure was used to prepare the same meat patty mix as set forth above, but with 13.3 lbs. of "Promate" 111, a textured, soy protein product having a density of 33 lbs./ft.$^3$, instead of the expanded product produced in this Example. "Promate" 111 material is a textured, explosion-puffed, proteinaceous product produced by extrusion of the type commercially available and made in substantial conformance with U.S. Pat. No. 3,488,770, and has size specifications of 30% (max.) on a 5-mesh screen, 60% (min.) through a 5-mesh screen and on a 10-mesh screen, and 5% (max.) through a 20-mesh screen.

both meat patty mixes were formed into 3-oz. patties using a Hollymatic patty maker.

The patties made with the expanded product of this Example had good color, and an excellent appearance (even better than the patties made with the "Promate" 111 product).

The next day meat patties made with both protein products were placed on a grill to subject them to cooking. The cooked patties were then tasted. The patties having the expanded product of this Example had decidedly better bit and textural characteristics than the patties made with the "Promate" 111 product.

The hydration qualities of both protein products were compared. Ten Gms. of the expanded product of this Example and 10 gms. of the "Promate" 111 product were each placed in boiling water for 10 min. The product of this Example had 200% water absorption, as compared with 350% for the "Promate" 111 product. Our hydrated product of this Example, with its distinctive layered or sheet-like structure, exhibited bite and textural qualities closely simulating natural foods, particularly natural meat products. However, the hydrated "Promate" 111 product, when placed in the mouth, had a spongy feel and exhibited little texture.

An extended meat composition having the flavor, chewiness and texture of natural meat may be prepared with blends having (a) at least 10% and not more than 90% by weight of our substantially homogeneous, expanded, cooked, edible proteinaceous product having tissue-like texture and a matrix with steam-generated cells therein, and (b) compatible natural meat (includes fowl or fish). Ground meat patties, for example, may be produced having (a) from 25% to 75 % by weight of natural meat (includes fowl or fish), and (b) at least 15% by weight, based on the weight of the natural meat, of our expanded proteinaceous product having organized steam-generated cells and good textural and water absorption properties while retaining its structural integrity under retorting conditions. Such meat patties provide, after being cooked, the following minimum characteristics:

a. a cooked yield substantially greater than without our expanded product;

b. a cohesiveness at least about equal to that without our expanded product; and, c. a texture at least about as good as without said additive.

EXAMPLE IX

The following admixture was uniformly blended before being fed to and through the Sterling extruder assembly 90, shown in FIG. 5, which included, under our controlled operating conditions, a die assembly:

| Materials | | |
|---|---|---|
| Soy Flour | 100 | lbs. |
| Calcium Chloride | 2 | lbs. |
| Trisodium Phosphate | 0.5 | lb. |
| Durkex 500 | 0.5 | lb. |
| Water | 29 | lbs. |

The soy flour was Soy Flour I-200. Durkex 500 was a stabilized vegetable oil.

The solid ingredients were blended with the soy flour and Durkex 500 oil, and the blend was fed to a turbulizer at a rate of 730 lbs./hr. while the water was added at a rate of 210 lbs./hr.

The resulting admixture was then fed to the Sterling extruder assembly 90. The internal cylindrical surface of the extruder barrel 91 defined an outer die wall 102, and the rotary compression screw 93 defined a rotary, inner die wall. The outer die wall 102 and screw 93, together, formed, in effect, a die adapter where the open cross-sectional region 110 of an introductory portion of the die assembly is gradually reduced, and therefore the space between the outer die wall 102 and the core of the rotary screw 93 provided, in effect, a forming or shaping die.

The medium, 3:1 compression screw 93 of the Sterling extruder assembly 90 was rotated at 110 rpm. with a 150 HP motor (not shown) using about 130 amps.

The interior portion of the outer die wall 102 of zones I–IV of the die was maintained at temperatures of 160°F., 305°F., 335°F., and 179°F., as determined by the thermocouples 103, 104, 105 and 106, respectively.

During the run, no additional heat was electrically applied beyond zone III. In zone IV, a maximum amount of cooling water was used so as to reduce and maintain the temperature of the outer die wall at 179°F.

The screw was cooled from the inside with tap water circulated at the rate of 14 gals./hr. The water was discharged from the screw at a temperature of 214°F.

The retention time for the material in the extruder ranged from about 40 to 45 seconds. Although a melt may have been partly or wholly formed in zone II, it was certainly present in zones III and IV. The material emerged from the die orifice into the atmosphere in the from of a continuous, spirally-shaped ribbon. That ribbon exhibited steam-generated cells and the effects of balloon-puffing.

The moist extrudate was allowed to dry and its density was determined to be 43 lbs./ft.$^3$, was subdivided, in a dry state, in a Waring blender, and the resulting chunks were sized to provide Samples 1 and 2 as shown below:

| | |
|---|---|
| Sample 1 | |
| Through a 4-Mesh Screen* | 100% |
| Retained on a 5-Mesh Screen* | 100% |
| Sample 2 | |
| Through a 5-Mesh Screen* | 100% |
| Retained on a 10-Mesh Screen* | 100% |

*U.S. Standard screen.

The water absorption capacity of both Samples was determined under the conditions indicated in Table VII, below, and gave the results shown therein.

Table VII

| Samples | Percent Water Absorption | | |
|---|---|---|---|
| | Cold Water | Hot Water | Retorting |
| Sample 1 | 178% | 238% | 298% |
| Sample 2 | 232% | 258% | 289% |

It was further noted that after both Samples were subjected to the hot (boiling) water and retorting conditions indicated in Table VII, above in each instance they retained their structural integrity, had good texture, and were chewy.

When the extrudate of this Example was retorted and tested for three-dimensional network structure involving disulfide cross-linking, that distinctive network structure remained intact, and thus was significantly retained after retorting. That is, the product swelled in contact with 6 M guanidine hydrochloride solution buffered at a pH of 8.5, thereby indicating retention of its three-dimensional network structure after retorting. The product was substantially solubilized and lost its physically self-supporting structure and form in a solution of 6 M guanidine hydrochloride buffered at a pH of 8.5 and 0.1 M mercaptoethanol, thereby indicating that the aforesaid three-dimensional network structure was due to disulfide cross-linking. This network structure, for example, distinguishes the product from explosion-puffed products.

The forms of our invention herein shown and described are to be considered only as illustrative. It will be apparent to those skilled in the art that numerous modifications may be made without deparature from the spirit of the invention or the scope of the appended claims.

We claim:

1. A ballon-puffed, structured proteinaceous product having steam-generated cells therein and a three-dimensional network structure characterized by disulfide bonding, which network structure remains significantly intact following retorting.

2. The balloon-puffed product of claim 1, which product is edible.

3. The product of claim 1, wherein the product has a protein content of at least about 30% by weight on a dry basis and includes a proteinaceous material selected from the group consisting of (a) solvent-extracted vegetable oil seed, (b) cereal grain, (c) casein, and (d) mixtures thereof.

4. The balloon-puffed product of claim 1, which product has a density of at least about 30 lbs./ft$^3$.

5. The balloon-puffed product of claim 1, which product is an extrudate.

6. An edible, balloon-puffed, fibrous proteinaceous product having structured texture and steam-generated cells, a predominance of which cells are defined by shear-worked cells walls, which product is characterized by having good water absorption properties while retaining its structural integrity under retorting conditions.

7. The product of claim 6, wherein the product has a dry protein content of at least about 30% by weight on a dry basis and includes a proteinaceous material selected from the group consisting of (a) solvent-extracted vegetable oil seed, (b) cereal grain, (c) casein, and (d) mixtures thereof.

8. An edible proteinaceous extrudate having meat-like structure and balloon-puffed cells, which product is characterized by having good water absorption properties and by retaining its structural integrity under retorting conditions.

9. The product of claim 8, wherein said product includes defatted soy protein material, and has a protein content of at least about 40% on a dry weight basis.

10. The product of claim 8, wherein a predominance of said balloon-puffed cells are arranged in substantially coaxially-defined, laminar layers.

11. The product of claim 8, wherein the density of the product increases away from the central longitudinal axis of extrusion.

12. The product of claim 8, wherein said product has a density of at least about 30 lbs./ft.$^3$

13. The product of claim 8, wherein said product has a density of at least about 40 lbs./ft.$^3$

14. The product of claim 8, wherein said product, as extruded, has a glassy skin.

15. An edible proteinaceous extrudate having meat-like texture and longitudinally layered, steam-generated cells therein which define a significantly undisrupted cellular structure, said extrudate being characterized by having good water absorption properties and by retaining its structural integrity under retorting conditions.

16. A balloon-puffed proteinaceous product having an organized cellular structure, said product being characterized by being produced by a method which comprises continuously pressing a column of hot, viscous, proteinaceous plastic material containing a volatile liquid component through and from an elongated die assembly, the temperature of the viscous material being below the applicable boiling point of the volatile liquid component during passage through an initial, upstream portion of the die assembly, and being controlled to be slightly above the applicable boiling point of the volatile liquid component as it emerges from the die assembly, so that balloon-puffing occurs to produce a structured product.

17. The product of claim 16, wherein the product hahs a protein content of at least about 30% by weight on a dry basis and includes a proteinaceous material selected from the group consisting of (a) solvent-extracted vegetable oil seed, (b) cereal grain, and (c) casein, and (d) mixtures thereof, and said volatile liquid component is water.

18. A proteinaceous extrudate having meat-like texture and organized steam-generated cells therein, said extrudate characterized by being produced by a method comprising: heating moist, crumbly, edible proteinaceous material having a protein content of more than about 30% on a dry weight asis and water while working it under mechanical pressure to form a column of hot, viscous plastic mass, advancing the viscous mass at a temperature above the atmospheric boiling point of the water through a confined space in a length of an elongated, open-ended die assembly; reducing the pressure within the die assembly to the vicinity of atmospheric pressure while adjusting the temperature of the advancing mass by non-adiabatic means to a lower temperature still above but sufficiently close to the applicable boiling point of the water to produce restricted boiling of water and to initiate the formation of steam-generated, ballon-puffed cells within the confined mass; and, extruding the mass from the die assembly.

19. The product of claim 18, wherein the product invludes a proteinaceous material selected from the group consisting of (a) solventextracted vegetable oil seed, (b) cereal grain, (c) casein, and (d) mixtures thereof.

20. An additive-extended ground meat product containing from about 25% to 75% by weight of natural meat and, distributed in said product, a hydrated textured proteinaceous additive, said additive being an edible, balloon-puffed proteinaceous extrudate having meat-like texture, which extrudate is characterized by having good water absorption properties and by retaining its structural integrity under retorting conditions:

21. The method for preparing a structured proteinaceous product which comprises:

continuously pressing a column of hot, viscous, proteinaceous mass containing a volatile liquid component through and from an elongated die assembly, the temperature of the viscous mass being below the applicable boiling point of the volatile liquid component during passage through an initial, upstream portion of the die assembly, and being controlled to be slightly above the applicable boiling point of the volatile liquid as it emerges from the die assembly, so that ballon-puffing occurs to produce a structured product.

22. The method of claim 21, wherein said viscous mass during passage through a length of said die assembly is a plastic melt, and said volatile liquid component is water, and the pressure drop as the melt leaves the die assembly is insignificant.

23. The method of claim 21, wherein said viscous mass is a plastic melt which includes a proteinaceous material having a protein content of at least about 30% by weight on a dry basis selected from the group consisting of (a) solvent-extracted vegetable oil seed, (b) cereal grain, (c) casein, and (d) mixtures thereof, and said volatile liquid component is water.

24. The method for forming a product comprising: heating moist, crumbly, edible, proteinaceous material having a protein content of at least about 30% on a dry weight basis and water while working it under mechanical pressure to form a column of hot, viscous plastic mass; advancing the viscous mass at a temperature above the atmospheric boiling point of the water through a confined space in a length of an elongated, open-ended die assembly; reducing the pressure within the die assembly to the vicinity of atmospheric pressure while adjusting the temperature of the advancing mass by non-adiabatic means to a lower temperature still above but sufficiently close to the applicable boiling point of the water to produce restricted boiling of water and to initiate the formation of steam-generated, ballon-puffed cells within the confined mass; and, extruding the mass from the die assembly.

25. The method of claim 24, wherein said proteinaceous material includes a material having a protein content of at least about 40% by weight on a dry basis selected from the group consisting of (a) solvent-extracted vegetable oil seed, (b) cereal grain, (c) casein, and (d) mixtures thereof.

26. The method for forming a product comprising: heating moist, crumbly, edible, proteinaceous material having a protein content of at least about 30% on a dry weight basis and water while working it under mechanical pressure to form a hot, viscous plastic mass; advancing a column of the viscous mass at a temperature above the atmospheric boiling point of the water through a confined space in a length of an elongated, open-ended die assembly; and, reducing the pressure within the die assembly to the vicinity of atmospheric pressure while adjusting the temperature of the advancing mass by non-adiabatic means to a lower temperature still above but sufficiently close to the applicable boiling point of the water to produce restricted boiling of water and to provide the formation of steam-generated, balloon-puffed cells within the mass.

27. The method of expanding a moist, proteinaceous plastic mass which comprises: forming a water-moistened, viscous plastic proteinaceous mass into a confined, advancing column under substantial pressure and at a temperature above 210°–212°F. but below the applicable boiling point of the water; and, thereafter reducing the pressure in the advancing mass while reducing its temperature to a temperature at which the water boils at the prevailing pressure to cause balloon-puffing.

28. The method of expanding a moist, edible, proteinaceous mass which comprises: forming a water-moistened, viscous proteinaceous melt into an advancing, but physically confined, column under substantial pressure and at a temperature above 212°F. but below the applicable boiling point of the water; reducing the pressure of the confined, advancing melt while reducing its temperature to induce restricted boiling of the water; and, discharging the resulting melt from its confined conditions to produce a steam-expanded, ballon-puffed proteinaceous product.

29. The method for forming a product comprising: subjecting non-fluid, water-moistened, edible, proteinaceous material to working under mechanical pressure with heat sufficient to convert it to a hot, viscous plastic mass; advancing the mass through a confined space within the length of an elongated die while reducing the pressure to produce limited boiling of the water and to initiate the formation of steam-generated, balloon-puffed cells within the confined, advancing mass; and, extruding the mass from a substantially unrestricted die orifice.

30. The method of claim 29, wherein the reduction in pressure results by frictional resistance of the viscous plastic mass to advancement through the die, and said extrusion from the die orifice is at substantially atmospheric pressure.

31. The method comprising: subjecting water-moistened, edible, proteinaceous material to working under mechanical pressure with heat sufficient to convert it to a hot, viscous glassy mass; passing the mass through a confined space within a length of an elongated die while reducing the pressure to initiate limited boiling of the water and to initiate the formation of steam-generated, balloon-puffed cells arranged within the mass in a sheet-like pattern; and, extending the mass from the die.

32. The method comprising subjecting water-moistened, edible, proteinaceous material to working under mechanical pressure with heat sufficient to convert it to a viscous plastic mass; passing the mass through the confined space within a length of an elongated die under diminishing pressure while the mass is at a temperature above the atmospheric boiling point of the water; adjusting that temperature of the advancing mass by non-adiabatic means to a lower temperature above but sufficiently close to the applicable boiling point of the water to initiate restricted boiling of water and to initiate the formation of steam-generated, balloon-puffed cells within the confined mass; and, extruding the mass from the die.

33. The method of claim 32, wherein said proteinaceous material includes a material having a protein content of at least about 30% by weight on a dry weight basis selected from the group consisting of (a) solvent-extracted vegetable oil seed, (b) cereal grain, (c) casein, and (d) mixtures thereof.

34. The method of claim 32, wherein the temperature of the mass before but at the vicinity of where it leaves the die is in the vicinity of from about 212° to about 230°F.

35. The method of claim 32, wherein steam-generated cells initially formed within the confined, advancing mass provides nuclei for forming larger, ballon-puffed cells within the extrudate.

36. The method of claim 32, wherein the extrudate, as extruded, has a glassy skin.

37. The method for forming a product comprising: subjecting water-moistened, edible, proteinaceous material to working under mechanical pressure with heat sufficient to convert it to a hot, viscous plastic mass; causing the mass to be shear-worked while advancing under diminishing pressure in a laminar manner with gradational coaxial flow through a length of an elongated open-ended die while the mass is at a temperature above the atmospheric boiling point of the water and while adjusting the temperature by non-adiabatic means to a temperature above but sufficiently close to the applicable boiling point of the water to induce restricted boiling of water and to initiate the formation of steam-generated, balloon-puffed cells within the confined, advancing mass; and, extruding the mass from the die.

38. The method comprising:

subjecting water-moistened, edible, proteinaceous material to working under mechanical pressure with heat sufficient to convert it to a hot, viscous plastic melt; advancing the melt through a length of an elongated die while the melt is at a temperature above the atmospheric boiling point of the water; reducing that temperature by non-adiabatic means while reducing the pressure to initiate restricted boiling of water and to initiate the formation of steam-generated cells within the confined, advancing melt to form a foraminous structure; and, extruding the foraminous melt from a die orifice to produce a balloon-puffed product.

39. The method for forming a product comprising: subjecting water-moistened, edible, proteinaceous material to working under mechanical pressure with heat sufficient to convert it to a hot, viscous plastic mass; causing the mass to be shear-worked while advancing in a laminar manner with gradational coaxial flow through a length of an elongated die while the mass is at a temperature above the atmospheric boiling point of the water; reducing that temperature by non-adiabatic means while reducing the pressure to produce restricted boiling of water and to initiate the formation of steam-generated cells with shear-worked walls within the confined, advancing mass to form a foraminous structure; and, extruding the resulting foraminous mass from a substantially unrestricted die orifice under balloon-puffing conditions.

40. The method comprising:

subjecting water-moistened, edible, proteinaceous material to working under mechanical pressure with heat sufficient to convert it to a hot, viscous plastic mass; advancing the mass through a length of an elongated die while the mass is at a temperature above the atmospheric boiling point of the water; reducing that temperature by non-adiabatic means while significantly reducing the pressure by frictional resistance of the viscous plastic mass to advancement through the die to initiate restricted boiling of water and to initiate the formation of steam-generated cells within the confined, advancing mass to form a foraminous structure; and, extruding the resulting foraminous mass from a die-orifice under balloon-puffing conditions.

41. The method of forming a proteinaceous balloon-puffed extrudate comprising: converting water-moistened proteinaceous material into a hot, glassy, viscous plastic melt under pressure; extruding an advancing column of the hot melt through and from a confined passageway within the length of an elongated, open-ended die assembly; and, controlling the pressure, temperature and viscosity of the confined, advancing column and applying frictional resistance to advancement of the melt in contact with the passageway to provide balloon-puffing while avoiding significant disruption of the product.

42. A balloon-puffed proteinaceous formed extrudate, said extrudate being characterized by being produced by a method comprising: converting water-moistened proteinaceous material into a hot, glassy, viscous plastic melt under pressure; extruding an advancing column of the hot melt through and from a confined passageway within the length of an elongated, open-ended die assembly; and, controlling the pressure, temperature and viscosity of the confined, advancing column and applying frictional resistance to advancement of the melt in contact with the passageway to provide balloon-puffing while avoiding significant disruption of the product.

43. The product of claim 42, wherein the product includes a proteinaceous material selected from the group consisting of (a) solvent-extracted vegetable oil seed, (b) cereal grain, (c) casein, and (d) mixtures thereof.

44. A balloon-puffed, structured proteinaceous product, said product being characterized by being produced by a method which comprises: heating moist, crumbly, edible, proteinaceous material having a protein content of at least about 30% on a dry weight basis while working it under mechanical pressure to form a hot, viscous plastic mass; advancing a column of the viscous mass at a temperature above the atmospheric boiling point of the water through a confined space in a length of an elongated, open-ended die assembly; and, reducing the pressure within the die assembly to the vicinity of atmospheric pressure while adjusting the temperature of the advancing mass by non-adiabatic means to a lower temperature still above but sufficiently close to the applicable boiling point of the water to produce restricted boiling of water and to provide the formation of a structured product having steam-generated, balloon-puffed cells within its mass.

45. A food composition comprising (a) a significant proportion of a textured proteinaceous product which is a balloon-puffed proteinaceous extrudate having meat-like texture and being characterized by having good water absorption properties and retaining its structural integrity under retorting conditions, and (b) at least one other foot product that is compatible with said textured product.

* * * * *

UNITED STATES PATENT OFFICE
CERTIFICATE OF CORRECTION

PATENT NO. : 3,904,769

DATED : September 9, 1975

INVENTOR(S) : Louis Sair and Donald W. Quass

It is certified that error appears in the above-identified patent and that said Letters Patent are hereby corrected as shown below:

Column 2, line 68, substitute --component-- for "comonent"; column 4, line 14, substitute --forces-- for "force"; column 4, line 21, insert --F.-- after "3°"; column 4, line 33, substitute --mean-- for "means"; column 9, line 53, substitute --retorting-- for "retoring"; column 10, line 27, substitute --coils-- for "coilsl"; column 10, line 28, substitute --241-- for "241"; column 10, line 29, substitute --89-- for "89"; column 10, line 30, substitute --7-- for "7"; column 10, line 31, substitute --24-- for "24"; column 13, line 17, substitute --fed-- for "feed"; column 15, line 19, after "45.", the sentence beginning with "The downwardly directed" should start a new paragraph; column 16, line 55, substitute --to-- for "ro"; column 18, line 26, substitute --involved-- for "involves"; column 25, line 28, substitute --1/2-- for "178"; column 27, line 6 from the bottom, substitute --IV-- for "Iv"; column 29, line 1, substitute --280.4°F.-- for "280,4°F."; column 29, line 6 from the bottom, substitute --Both-- for "both"; column 30, line 5, substitute --bite-- for "bit"; column 31, line 57, insert a comma [,] after "above" and before "in each instance"; and, column 33, line 32, substitute --basis-- for "asis".

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,904,769

DATED : September 9, 1975

INVENTOR(S) : Louis Sair and Donald W. Quass

It is certified that error appears in the above-identified patent and that said Letters Patent are hereby corrected as shown below:

Column 2, line 42, substitute -- and -- for "are"; column 5, line 21, substitute -- oleaginous -- for "oleoginous"; column 6, line 38, substitute -- under initially -- for "2 1/4"; column 8, line 23, after "jacket," insert -- partial jacket, --; column 8, line 47, after "115°" insert -- C. --; column 8, line 52, substitute -- balloon -- for "ballon"; column 9, line 35, insert a comma [,] after "Quass"; column 9, line 46, before "without" insert an opening parenthesis; column 11, line 12, after "sand" and before "100%" insert an opening parenthesis; column 11, at the end of the formula immediately following line 36, substitute -- 62.43* -- for "100%"; column 11, in the formula following line 55, insert a minus sign [-] in the line in which the word "Proteinaceous" appears in each of the phrases "Gms. of Hydrated Proteinaceous Material" and "10 Gms. of Dry Proteinaceous Material" and between those two words "Proteinaceous"; column 12 line 66 (line 2 from the bottom), after "assembly" insert a comma [,]; column 13, line 45, substitute -- 3/4 -- for "3/4to"; column 13, line 54, delete "thermocouple" and substitute -- or --; column 13, line 55, substitute -- thermocouple -- for "termocouple"; column 15, line 47, substitute -- discharge -- for "dichage"; column 16, line 5, substitute -- temperatures -- for "temperature"; column 17, line 7, substitute -- powered -- for "powdered"; column 18, lines 45 and 46, substitute -- solvent-extracted -- for "solventextracted"; column 19, line 14, substitute -- Runs -- for "Rins"; column 20, line 4, substitute -- least -- for "lease"; column 32, line 16, substitute -- balloon -- for "ballon"; column 32, line 41, delete "dry"; column 33, line 21, substitute -- has -- for "hahs"; column 33, line 24, delete "and" after "grain,"; column 33, line 34, substitute a semicolon [;] for the comma [,] after "mass"; column 33, line 48, substitute -- includes -- for "invludes"; column 33, line 49,

UNITED STATES PATENT AND TRADEMARK OFFICE
CERTIFICATE OF CORRECTION

PATENT NO. : 3,904,769                          Page 2 of 2

DATED : September 9, 1975

INVENTOR(S) : Louis Sair and Donald W. Quass

It is certified that error appears in the above-identified patent and that said Letters Patent are hereby corrected as shown below:

substitute -- solvent-extracted -- for "solventextracted"; column 34, line 4, substitute -- balloon -- for "ballon"; column 34, lines 33 and 34, substitute -- balloon -- for "ballon", column 35, line 10, substitute -- balloon -- for "ballon"; column 35, line 36, substitute -- extruding -- for "extending"; column 35, line 38, insert a colon [:] after "comprising"; column 35, lines 64 and 65, substitute -- balloon -- for "ballon"; column 36, line 61 (last word), delete the hyphen [-] after "die"; and, column 38, line 24, substitute -- food -- for "foot".

Signed and Sealed this

Third Day of August 1976

[SEAL]

Attest:

RUTH C. MASON
*Attesting Officer*

C. MARSHALL DANN
*Commissioner of Patents and Trademarks*